(12) United States Patent
Viñas Albert et al.

(10) Patent No.: US 12,532,980 B2
(45) Date of Patent: Jan. 27, 2026

(54) JUICING

(71) Applicant: CITRING UNIVERSAL, S.L., Barcelona (ES)

(72) Inventors: Roc Viñas Albert, Barcelona (ES); Catalina Amengual I Garí, Barcelona (ES); Pol Suárez Morales, Barcelona (ES)

(73) Assignee: CITRING UNIVERSAL, S.L., Barcelona (ES)

( * ) Notice: Subject to any disclaimer, the term of this patent is extended or adjusted under 35 U.S.C. 154(b) by 806 days.

(21) Appl. No.: 17/624,503

(22) PCT Filed: Jul. 2, 2020

(86) PCT No.: PCT/EP2020/068745
§ 371 (c)(1),
(2) Date: Jan. 3, 2022

(87) PCT Pub. No.: WO2021/001515
PCT Pub. Date: Jan. 7, 2021

(65) Prior Publication Data
US 2022/0395127 A1 Dec. 15, 2022

(30) Foreign Application Priority Data
Jul. 3, 2019 (EP) .................................. 19382567

(51) Int. Cl.
*A47J 19/02* (2006.01)
*A23N 1/00* (2006.01)
(Continued)

(52) U.S. Cl.
CPC .............. *A47J 19/02* (2013.01); *A23N 1/003* (2013.01); *A23N 1/02* (2013.01); *B30B 9/225* (2013.01)

(58) Field of Classification Search
CPC .. A23N 1/003; A23N 1/02; A47J 19/02; A47J 19/06; B30B 9/22; B30B 9/225
(Continued)

(56) References Cited

U.S. PATENT DOCUMENTS

| 1,850,001 A | 3/1932 | D'Annunzio et al. |
| 2,067,555 A | 1/1937 | Walker |

(Continued)

FOREIGN PATENT DOCUMENTS

| CN | 101534683 A | 9/2009 |
| CN | 108697147 A | 10/2018 |

(Continued)

OTHER PUBLICATIONS

International Search Report and Written Opinion of the International Searching Authority. International Application No. PCT/EP2020/068745 issued by the European Patent Office, mail date Aug. 12, 2020, 13 pages, Rijswijk, Netherlands.

*Primary Examiner* — Ibrahime A Abraham
*Assistant Examiner* — Joseph W Iskra
(74) *Attorney, Agent, or Firm* — Peter B Scull

(57) ABSTRACT

A citrus juicer is set forth including a deformable container forming an extracting chamber to receive at least one portion of citrus fruit, and having an opening for introducing the citrus fruit; a frame forming a socket to receive the deformable container; a dividing ridge having a cross-section with a tip oriented towards the extracting chamber, and the dividing ridge being arranged to divide the citrus fruit when the citrus fruit is pressed against the tip thereof; a pressing system to exert pressure on the extracting chamber and against the socket. A method for extracting juice from citrus fruit is also disclosed.

19 Claims, 18 Drawing Sheets

(51) Int. Cl.
*A23N 1/02* (2006.01)
*B30B 9/22* (2006.01)

(58) Field of Classification Search
USPC .......................................................... 99/495
See application file for complete search history.

(56) References Cited

U.S. PATENT DOCUMENTS

| | | | |
|---|---|---|---|
| 2,515,748 A | 7/1950 | Wallace et al. | |
| 2,705,452 A | 4/1955 | Johnson | |
| 11,357,253 B2 * | 6/2022 | Toubeaux | A47J 19/02 |
| 2019/0045829 A1 | 2/2019 | Yusy | |
| 2019/0069591 A1 | 3/2019 | Toubeaux | |

FOREIGN PATENT DOCUMENTS

| | | |
|---|---|---|
| EP | 2057922 | 5/2009 |
| FR | 3048587 A1 | 9/2017 |
| WO | WO2014182423 A2 | 11/2014 |
| WO | WO2015173690 A1 | 11/2015 |
| WO | WO2016161827 A1 | 10/2016 |
| WO | WO2017118373 * | 7/2017 |
| WO | WO2017118373 A1 | 7/2017 |
| WO | WO2017158278 A2 | 9/2017 |

* cited by examiner

JUICING

The present disclosure relates to citrus juicers for extracting juice from citrus fruit. The present disclosure further relates to methods for extracting juice from citrus fruit.

BACKGROUND

Juicers are commonly used to extract juice from food matter, which may include, inter alia, fruit and vegetables. There are many known forms of juicers or juice extracting devices.

One widely known form of juicer includes ribbed cones which rotate while a half of fruit is pressed on the cone. This is particularly known for citrus fruits. However, the citrus fruit has to be cut at least in two halves to be squeezed.

One further form of juicer is based on pressing the food matter to obtain the juice. Presses may be mechanically activated or may include pneumatical membranes.

Those known forms of juicers present several parts which contact with the food matter during the extraction process. Afterwards, those parts should be cleaned to keep the juicer in proper hygienic conditions. Moreover, the food matter has to be prepared by the user or the device before feeding the device, for instance cutting it. Particularly, in most of the cases the user has to manipulate the food matter, for instance, removing the peel or cutting the fruit or vegetable into smaller portions using tools like knives or the like. Therefore, it requires cleaning the used tools as well. All in all, those known forms are time-consuming and/or involve cumbersome devices.

In order to solve those disadvantages, devices have been developed for extracting juice from whole fruits housed in a bag, in which pressure is exerted on the bag for extraction. However, when it comes to citrus fruits, there is an issue related to the oil pockets in the peel. When this oil is released in certain amount the taste of the juice becomes unpleasant. The latter may occur when at least a portion of citrus fruit is smashed, burst, or even crushed by the pressure exerted during the extraction of juice.

Known solutions for the oil issue imply the use of a blade or the like to cut the peel before a pressure is exerted on the citrus fruit. These disclosures include cutting elements to section all or part of the citrus, and then pressing the sectioned citrus to extract the juice. However, the citrus juicing devices which include cutting elements are not compatible with solutions based on bags or the liked filled with food matter. Otherwise, the cutting element can tear the bag and the juice and pulp can be released from the bag. The bag could be torn every time juice was extracted. Therefore, the bag could not be used more than once, the juice would flow along with pulp in an uncontrolled way and the juicer should be cleaned after each extraction.

The present disclosure may provide examples of juicers and methods for extracting juice that may avoid or may reduce one or more of the afore-mentioned drawbacks.

SUMMARY

In a first aspect, a citrus juicer is provided. The citrus juicer includes a deformable container forming an extracting chamber to receive at least one portion of citrus fruit, and the deformable container has an opening for introducing the citrus fruit. The juicer further includes a frame forming a socket to receive the deformable container, and a dividing ridge having a cross-section with a tip oriented towards the extracting chamber, and the dividing ridge is arranged to divide the citrus fruit when the citrus fruit is pressed against the tip thereof. The citrus juicer also includes a pressing system to exert pressure on the extracting chamber and against the socket.

The pressure exerted on the extracting chamber with citrus fruit may be enough to deform the extracting chamber to a degree that extracts juice contained in the fruit.

The dividing ridge may have a cross-section tapering from a thick or wide portion to a thin or narrow portion. The tip may belong to the narrow portion.

The fruit may be, at least partially, opened/split/divided by the dividing ridge when a force is exerted on the fruit and against the tip of the dividing ridge. This may occur when the citrus fruit is fed into the extracting chamber or even later. Thus, the citrus fruit may be opened before the pressing system exerts pressure on the extracting chamber where the citrus fruit is placed to extract the juice.

Alternatively, the force may be applied by the dividing ridge on the fruit which may be restrained.

The dividing ridge may be configured to open or divide the citrus fruit.

The socket may be made from a material more rigid than the deformable container.

The tip may be an end or extreme or apex of the cross-section of the dividing ridge.

In accordance with this aspect, a citrus juicer is provided that the peel of the fruit may be opened in a controlled and predictable way by the interaction between the dividing ridge and the deformable container. The dividing ridge may guide the opening of the citrus fruit in a predefined location and in the proper time to avoid the fruit to be smashed when the pressing system applies a force and corresponding pressure to the extracting chamber. Thus, the release of oil may be, at least, limited.

Furthermore, thanks to the first aspect, a citrus juicer may be obtained with a combination of a washable container and a tool such as the dividing ridge able to guide the opening/splitting/division of the fruit. The deformable container is not worn by the dividing ridge when guiding the opening the fruit or even when the pressing system is operated.

The citrus juicer according to the first aspect may be a time-saving domestic household where the citrus fruit may be fed directly to the deformable container and the wastes may be readily removed from the deformable container after performing the juice extraction.

In an example, the citrus juicer may further include a panel to constrain the citrus fruit in the extracting chamber, at least one of the dividing ridge and the panel may be movable towards the other to cause the citrus fruit to be pressed against the tip of the dividing ridge. A relative movement may be defined between the dividing ridge and the panel. Thus, the distance between the panel and the dividing ridge may be varied. When a citrus fruit is placed in the extracting chamber, an approach between the dividing ridge and the panel may cause the fruit to be constrained and the tip to divide the citrus fruit.

If the panel is movable, a force may be exerted towards the fruit through the panel and the fruit may be divided by the tip of the dividing ridge. Alternatively, if the dividing ridge is movable, the dividing ridge may exert the force towards the fruit which is pushed against the panel.

In another example of the citrus juicer, the deformable container may include a sheet arranged between the dividing ridge and the extracting chamber. The sheet may be provided at least over a portion of the deformable container, such as the region where the extracting chamber may be defined. The dividing ridge does not tear or cut the sheet so the dividing ridge does not enter the extracting chamber. This way, the dividing ridge may guide the opening/splitting/division of the fruit to at least reduce the release of peel oil that can sour the juice, and the dividing ridge does not contact the fruit. Therefore, soiling of the dividing ridge (and other components) may be avoided and so, cleaning of the parts may be reduced after use.

In some examples of the citrus juicer, the deformable container may be configured to fully enclose the citrus fruit, for instance in a closed status of the socket. This way, only the extracting chamber may be soiled, so the cleaning tasks may be reduced even more.

In some further examples of the citrus juicer, the dividing ridge may be configured in such a way that at least a portion of the dividing ridge may enter the socket, in use. Put it in other words, at least a portion of the dividing ridge may be provided inside the socket, in use. The dividing ridge cannot gain access to the extracting chamber.

In some examples, the citrus juicer may include a holder to hold at least one portion of citrus fruit in the extracting chamber. The fruit may be held in a predefined position inside the extracting chamber with respect to the tip of the dividing ridge, seen in a cross-section view. As the citrus fruit is a natural item, the shape of the fruit may differ from each other. The fruit may be maintained in an optimal position to be divided and extracting the juice regardless of the shape of the fruit. The extraction of juice may be maximized.

In examples, the predefined position may be related to a position in which at least a tip of the dividing ridge, seen in a cross-section view, may be oriented substantially towards a geometric center of the citrus fruit. A dividing force may be properly applied to the fruit for dividing the fruit. The citric fruit may be divided by a substantially full extent of the dividing ridge or at least a partial extent of the dividing ridge when seen in a cross-section view. A further pressure may be uniformly applied on portions of the divided fruit that may be of a substantially similar size. Thus, the extraction of juice may be maximized.

In examples, when the dividing ridge moves back and forward with respect to the extracting chamber, the extent of the dividing ridge may define a stroke of the dividing ridge.

In some examples, the geometric center of the citrus fruit may be located substantially the same as the center of mass.

As above mentioned, the citrus fruits are natural items and the shape may differ from each other. Therefore, the predefined position may be related to a position in which at least a tip of the dividing ridge, seen in a cross-section view, may be oriented substantially away from the geometric center of the citrus fruit.

In examples of the predefined or optimal position, the fruit may be placed substantially centered in the extracting chamber with respect to, at least, a direction of a dividing force to be applied. The dividing force may be properly applied to the fruit for dividing the fruit. A further pressure may be uniformly applied on portions of the divided fruit. Thus, the extraction of juice may be maximized.

A fruit maintained in the predefined position may be divided in such a way that, for instance, two halves or portions with balanced sizes may be produced. The size of the halves may be substantially similar to each other. Each balanced half may receive the proper force to extract the juice, i.e. neither over nor under. So, the extraction of juice from the fruit may be optimized.

Therefore, keeping the fruit in a predefined position may cause that the extraction of juice may be performed more efficiently.

The fruit may be maintained in the predefined position before, during and/or after is divided.

Furthermore, the extracting chamber may receive citrus fruit of different diameters due to the holder. The extracting chamber may accept fruit having different diameters within a range of diameters. The fruit may be optimally positioned in the extracting chamber although they present different diameters within a predefined range.

Moreover, a citrus juicer may obtain juice from several fruits with different diameters from each other in the same extracting operation thanks to the holder. For instance, an extracting chamber may be designed to receive a plurality of whole citrus fruits, and at least one whole citrus fruit may have a different size from the rest.

In examples of the citrus juicer, an abutment region may be joined to the rest of the deformable container through a bellows. The bellows may allow to orderly and predictably dispose material of the deformable container when the abutment region adopts a retracted position with respect to the extracting chamber and to orderly and predictably expand material of the deformable container when the abutment region adopts an expanded position with respect to the extracting chamber in order to divide the fruit. The material folded as the bellows may prevent the dividing ridge from coming into contact with dirt and debris of the extracting chamber. Furthermore, space occupation within the socket may be minimized while the size of the extracting chamber may be maximized.

In a second aspect, a method for extracting juice from citrus fruit is provided. The method includes:
  feeding citrus fruit to an extracting chamber of a deformable container of a citrus juicer, the container being received in a socket;
  causing the fruit to be divided by a dividing ridge when the citrus fruit is pressed against a tip of the dividing ridge;
  pressing the extracting chamber with the opened citrus fruit against the socket to produce juice.

Advantages derived from this method may be similar to those mentioned regarding the first aspect.

In some examples of the method, it may further include exerting pressure on the extracting chamber in at least two pressing steps, and reducing, at least partially, the pressure exerted on the extracting chamber between the two pressing steps. Thanks to these features, the performance of the juicer may be improved even more.

In the present disclosure a citrus fruit may be, inter alia, an orange, a lemon, a mandarin, a bergamot, a citron, a lime, a grapefruit, a tangerine and so on.

In the present disclosure the citrus fruit may be a whole fruit or a portion of fruit.

Within the scope of the present disclosure, whole fruit and vegetables may be fed in the deformable container without manipulating them, e.g. without peeling them. However, the whole fruit and vegetables may be fed peeled as well. Alternatively, a portion of the fruit or vegetable may be fed in the deformable container.

A deformable container of the herein disclosed methods and devices may be regarded as a container able to substantially vary, at least partially, its general shape by applying pressure thereto. The force and corresponding pressure for deforming the container may be provided by the operation of any suitable pressing system. The pressing system may be designed to generate at least an amount of force over an area of the deformable container and so a pressure that may cause the container to change a predefined shape.

An object, part, device or the like, made from a flexible material of the herein disclosed methods and devices may be regarded as an object able to recover an original shape after it has been deformed by applying force thereto. The object may recover the previous shape when the pressing system is switched off.

Throughout the present disclosure, expression "in use" is to be understood as a juicer status when operated, i.e. performing at least one action related to the extraction of juice from the fruit.

Throughout the present disclosure, expressions such as horizontal, vertical, upper, lower, top, bottom, side, lateral, upwards, downwards etc are to be understood taking as a reference structure of a citrus juicer or the like in an operating condition as a reference.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
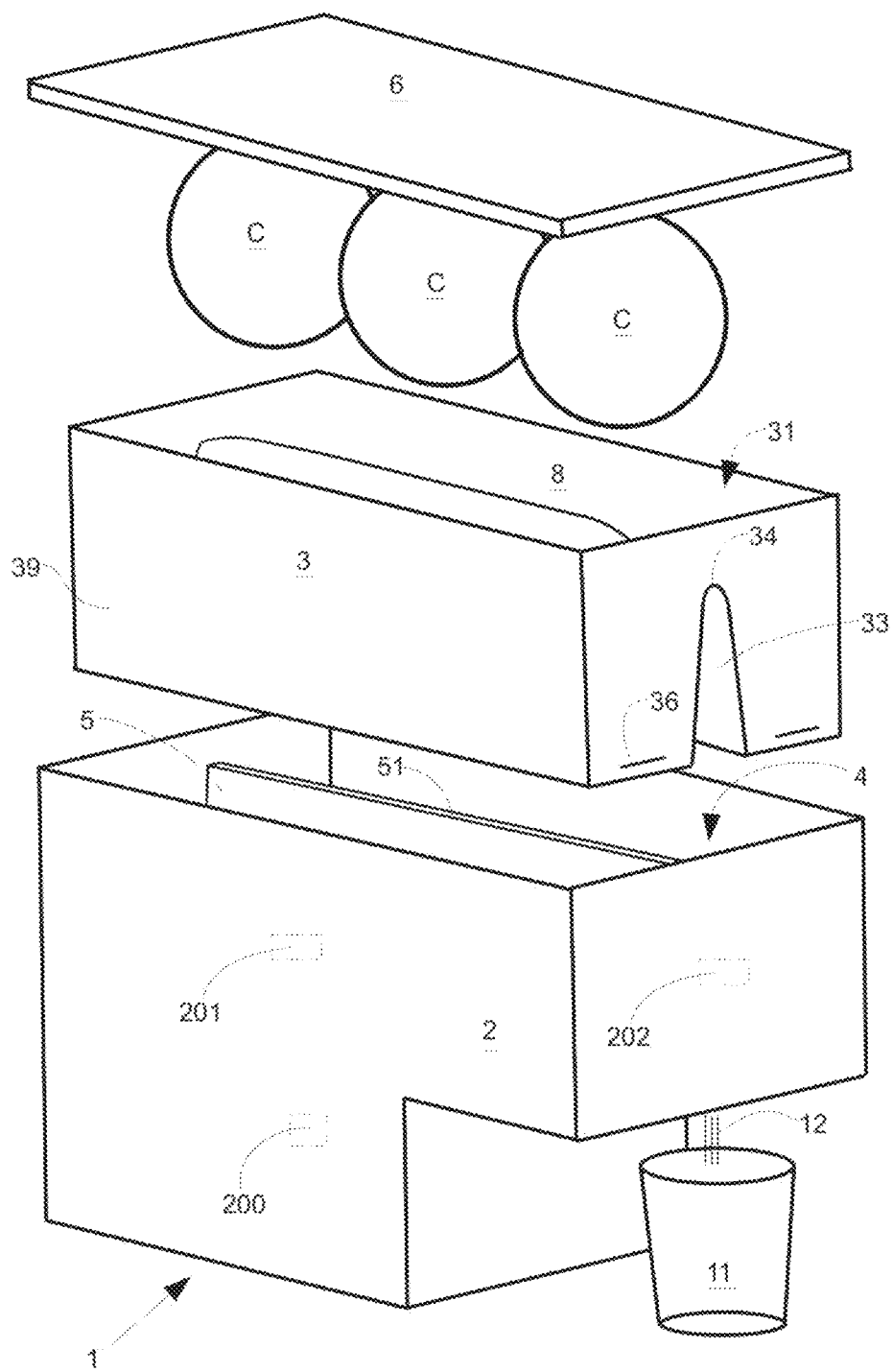
FIG. 1 schematically shows an exploded view in perspective of a citrus juicer according to an example.
Figure 2:
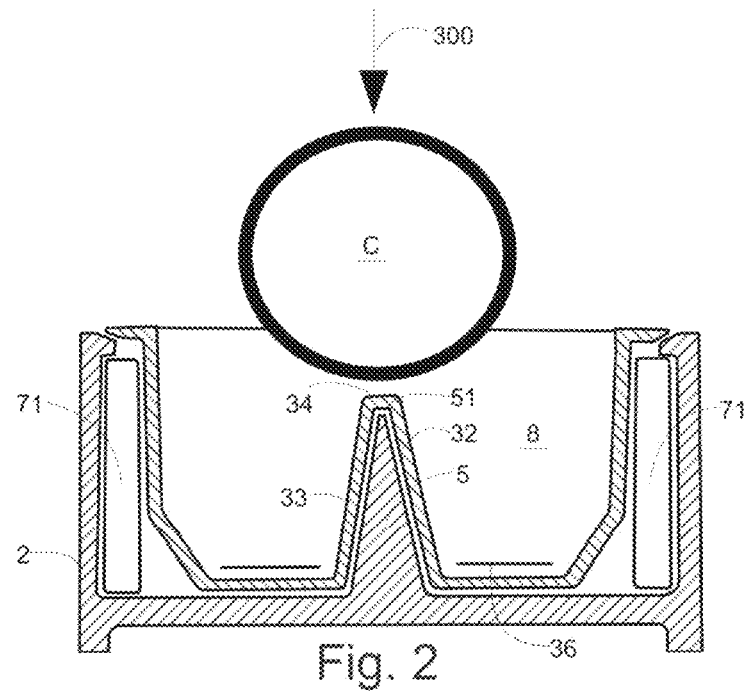
FIGS. 2-4 schematically show cross-section and partial views of the citrus juicer of FIG. 1 in different stages of a juice extraction.
Figure 3:
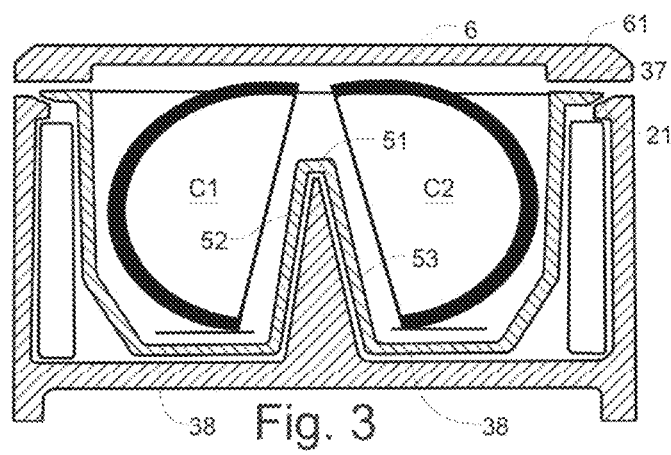

FIG. 1 schematically shows an exploded view in perspective of a citrus juicer 1 according to an example. Some elements which are not visible have been illustrated using dashed lines.

The citrus juicer 1 of FIG. 1 includes a deformable container 3 forming an extracting chamber 8 intended to receive at least one portion of citrus fruit C. The deformable container 3 may be made from a food-grade material. However, the container 3 may be configured as single-use or reusable.

The deformable container 3 may be made from a material suitable to undergo deformations. The material of the container 3 may be flexible as well. An example of suitable material may be platinum silicone.

In FIG. 1, three whole citrus fruits C have been illustrated without peeling or the like. However, these whole citrus fruits C could be already peeled, at least partially. Furthermore, the number of citrus fruits may vary depending on needs.

The deformable container 3 may be generally elongated. In particular, the example of FIG. 1 shows a deformable container 3 formed as a prism with a substantially rectangular cross section. Alternatively, the shape of the cross section or even the configuration as a prism may vary, for instance a cylindrical shape.

When the deformable container 3 is elongated, the citrus fruits C may be disposed substantially aligned with each other. However, alternative patterns defined by the citrus fruit C received by the deformable container 3 may be envisaged.

The deformable container 3 has an opening 31 for introducing the citrus fruit C. This opening 31 may be provided over the length of the top face of the prism-shaped deformable container 3. Alternatively, the opening 31 may be provided at one side face 39 of the prism or cylindrical-shaped deformable container 3 (example not shown).

The deformable container 3 may also include an outlet 36 to dispense juice 12 from pressed fruit C. The outlet may be provided in a bottom face 38 of the deformable container 3. Alternatively, the opening 31 may act as an outlet to deliver juice from the pressed fruit, i.e. the deformable container 3 may be configured as a tray-like container.

Figure 4:
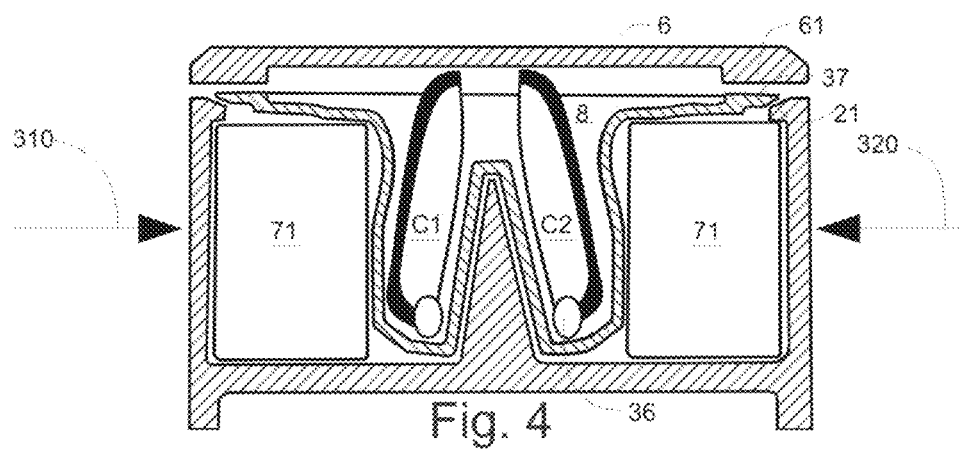
Figure 7:
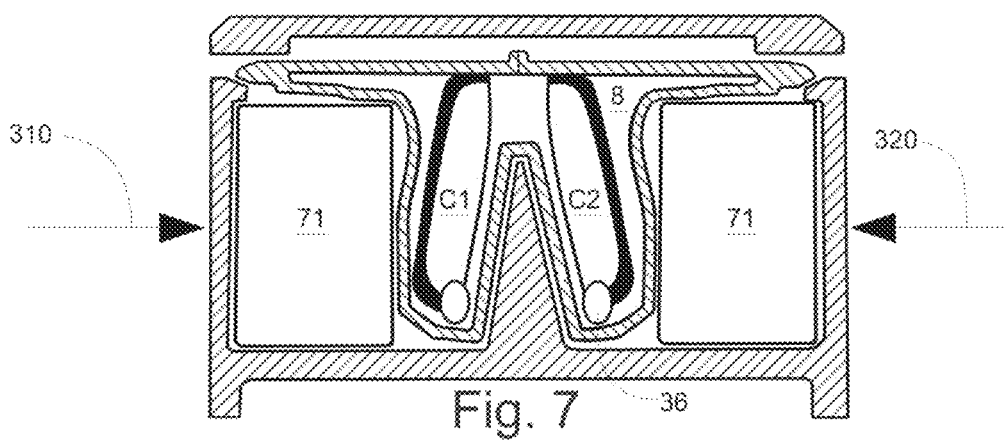
Figure 8:
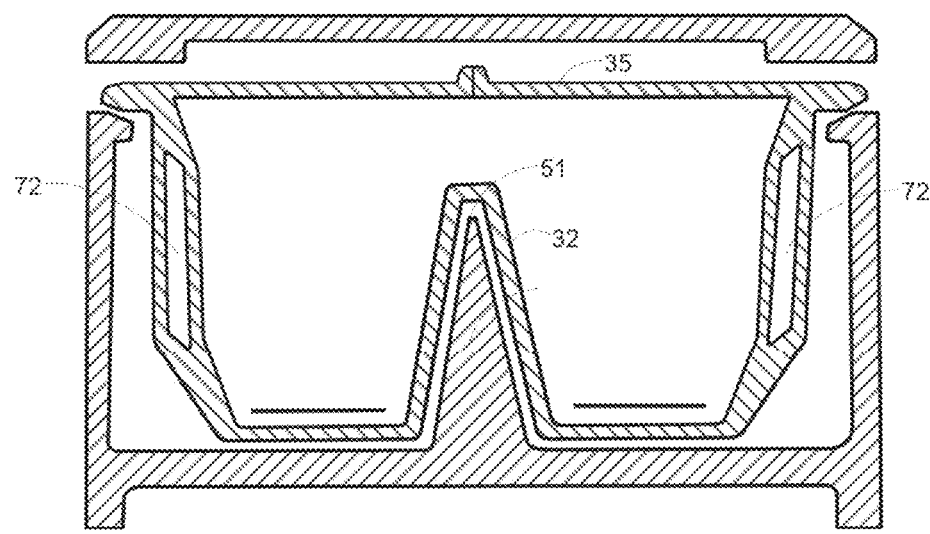
FIGS. 8-12 schematically show cross-section and partial views of various examples of a citrus juicer.
Figure 9:
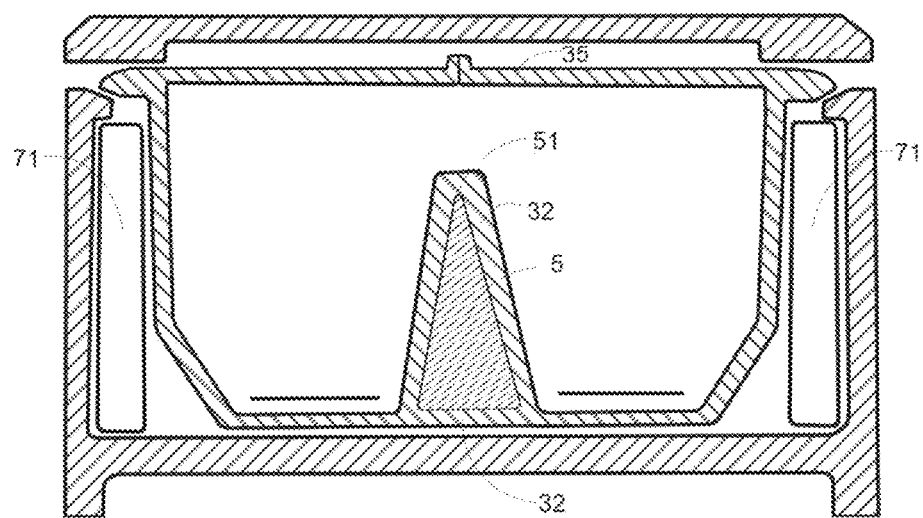
Figure 21:
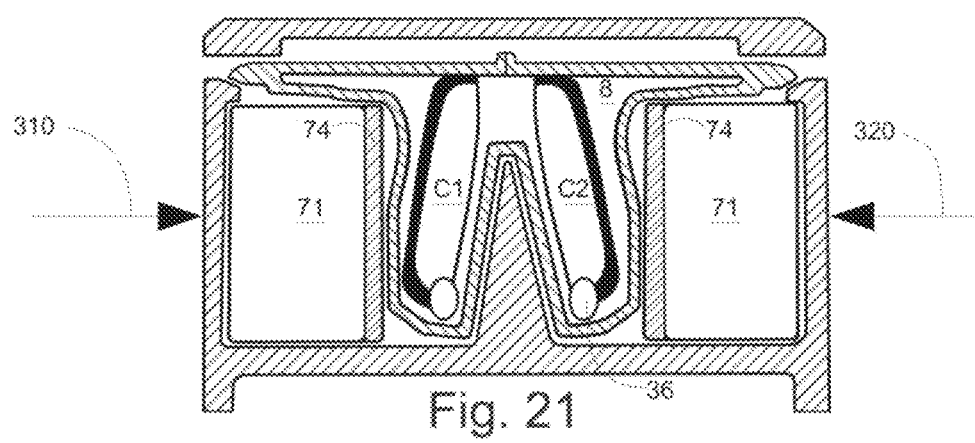
Figure 22:
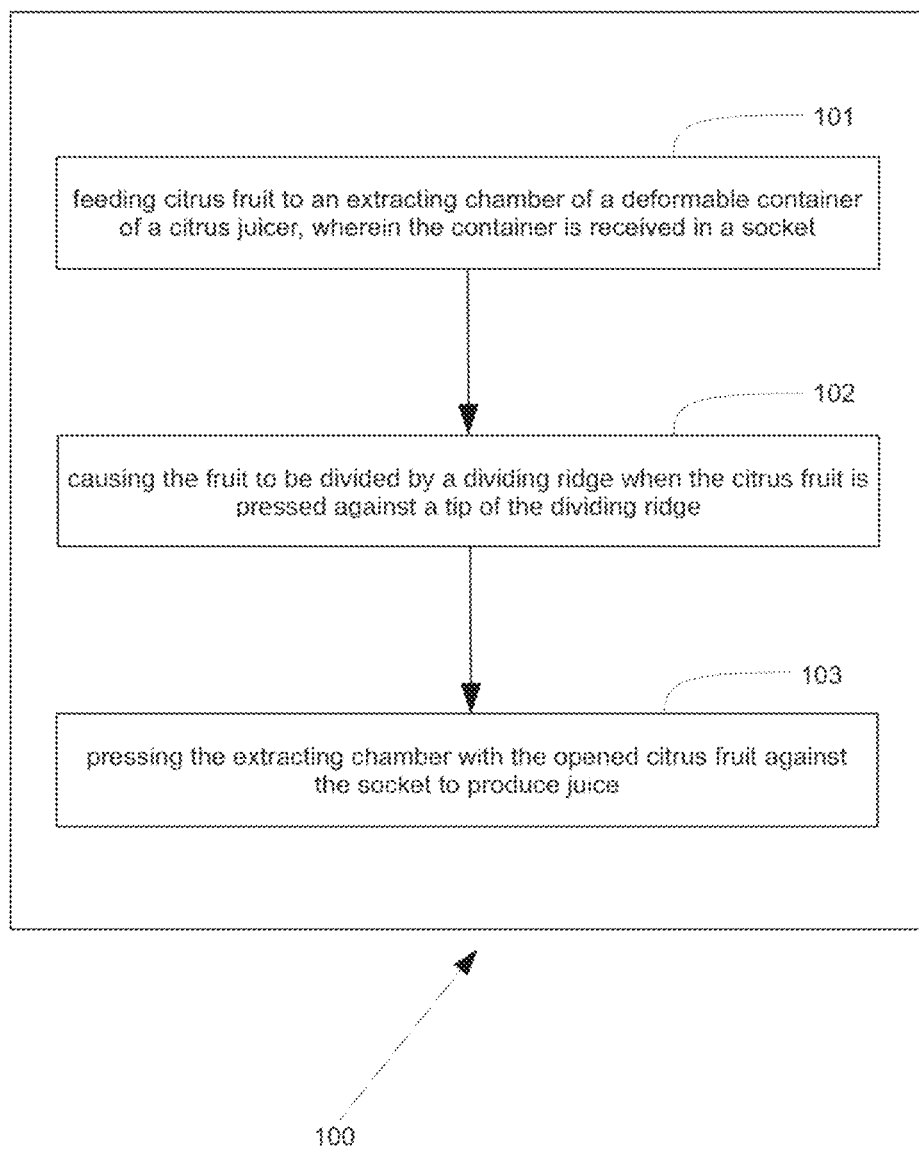
FIG. 22 shows a flowchart of a method for extracting juice from citrus fruit according to one example.

Furthermore, the deformable container 3 may include an outlet lid which may be embodied as a deformable tab to block the outlet 36 in a non-deformed state of the container 3 and to allow a flow of juice 12 through the outlet in a deformed state, see FIGS. 4, 7, 21. The deformable tab of the outlet 36 may be deformed when the deformable container 3 is deformed at least a predefined extent.

The citrus juicer 1 may have a filter (not illustrated) attached to the outlet 36 to sift the juice obtained from the citrus fruit C. The amount of pulp of the juice delivered by the citrus juicer 1 may be adjusted by chosen a filter with predefined sieving characteristics.

Following with FIG. 1, it can be seen the citrus juicer 1 which further includes a frame 2 forming a socket 4 to receive the deformable container 3. The deformable container 3 may be detachably coupled to the socket 4 of the frame 2. Thus, the deformable container 3 may be removed for cleaning tasks or replaced with another one. Furthermore, an exemplary deformable container 3 may fit the general shape of the socket 4, at least partially.

Figure 5:
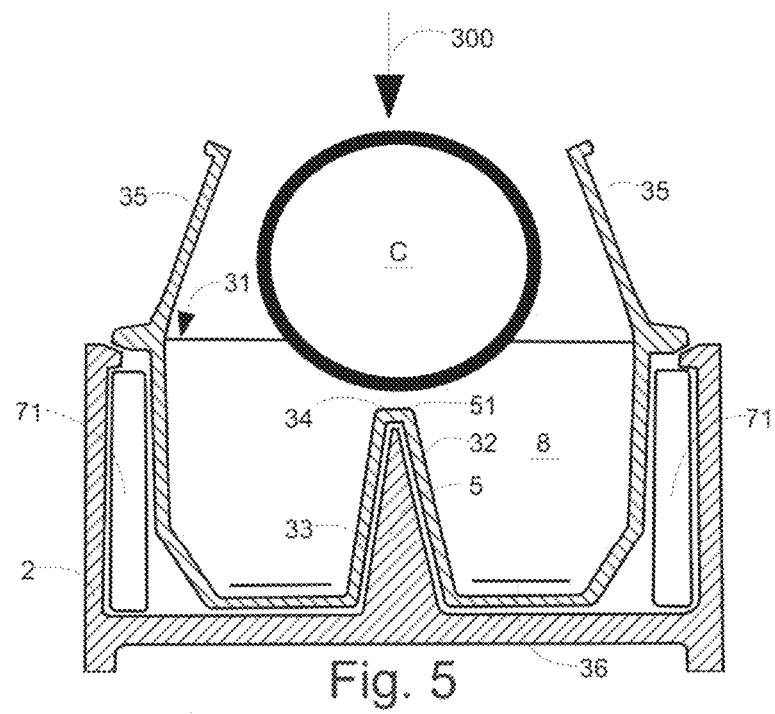
FIGS. 5-7 schematically show cross-section and partial views of a citrus juicer according to another example in different stages of a juice extraction.
Figure 6:
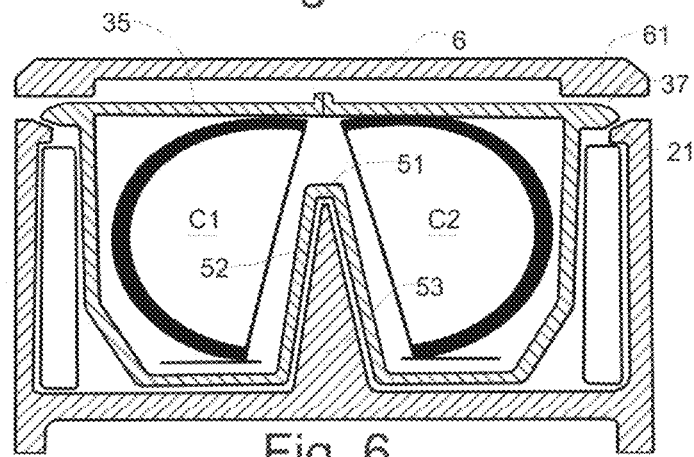

The opening 31 may be closed by a socked lid 6, and/or the deformable container 3 may be provided with a container lid 35 as per FIGS. 5-7 for closing or shutting the opening 31. By way of example, in FIGS. 2, 5, 16, 19 socked lid 6 is in an open state and in FIGS. 3, 4, 6, 7, 17, 18, 20, 21 the socked lid 6 is in a closed state.

As per FIGS. 3-4 and 6-7, the deformable container 3 may have a rim 37 extending outwardly from side faces 39 thereof, i.e. in a substantially opposite direction to the extracting chamber 8. The frame 2 may have a flange 21 extending inwardly, namely towards the socket 4 intended to receive the deformable container 3. In some examples, the rim 37 and the flange 21 may have bevelled edges designed to contact each other. The bevelled edges can be seen in FIGS. 2-21.

Furthermore, the lid 6 may have a perimeter protuberance 61 intended to contact the frame 2 at least partially. The perimeter protuberance 61 may be configured to be positioned towards the extracting chamber 8 when the lid 6 shuts the opening 31. Thus, the rim 37 may be sandwiched between the perimeter protuberance 61 and the flange 21. Therefore, the extracting chamber 8 may be tightly closed.

In some examples, as those illustrated in FIGS. 3, 4, 6 and 7, the rim 37 of the deformable container 3 may be clamped by the perimeter protuberance 61 of lid 6 and the flange 21. This way, at least a portion of the deformable container 3 may be kept in place despite the deformation undergone by the rest of the container 3 at least when the pressing system exerts pressure on the extracting chamber 8.

A glass 11 has been illustrated substantially under the frame 2. The outlet 36 may be positioned relatively to frame 2 so as to allow the flow of juice 12 to be poured into the glass 11, vessel, cup, jar or the like.

The citrus juicer 1 includes a dividing ridge 5 as well. The dividing ridge 5 has a cross-section with a tip 51. As illustrated for example in FIGS. 2-7, the tip 51 is oriented towards the extracting chamber 8. The dividing ridge 5 is arranged to divide the citrus fruit C when the citrus fruit C is pressed against the tip 51 thereof. As can be clearly seen for instance in FIGS. 3, 4, 6, 7, the sheet of the deformable container 3 is provided between the dividing ridge 5 and the extracting chamber 8. The dividing ridge 5 does not enter the extracting chamber 8.

The dividing ridge 5 of FIGS. 2-7 has a cross-section with a narrow portion 52 and a wide portion 53. Alternatively, the cross-section may have a substantially homogeneous width, e.g. a substantially constant width. In other alternatives, the tip 51 may have a different cross-section from the rest of the dividing ridge 5.

The dividing ridge 5 may be configured to guide the opening of the citrus fruit C, for instance when a force 300 is applied on the citrus fruit C through the opening 31. Alternatively, a force opposite to the illustrated force 300 may be applied through the dividing ridge 5 against the fruit C.

The citrus juicer 1 may further include a panel to constrain the citrus fruit C in the extracting chamber 8. By way of example, the panel may be the socked lid 6 or the container lid 35 or a socket wall. At least one of the dividing ridge 5 and the panel may be movable towards the other to cause the citrus fruit C to be pressed against the tip 51 of the dividing ridge 5.

The dividing ridge 5 may be placed in such a way that the tip 51 may be substantially aligned with a median line of the socket 4, and so the opening 31. The tip 51 may be a substantially flat or rounded surface or even a vertex.

The citrus juicer 1 includes a pressing system which has not been illustrated in FIG. 1 for the sake of clarity. However, some examples thereof can be seen in FIG. 2-7 or 13-18. The pressing system is configured to exert pressure on the extracting chamber 8 and against the socket 4. This may be achieved through an action-reaction principle. In some cases, the pressing system may exert the pressure on the container in a uniform manner. Details about the operation will be provided later on.

The pressing system may have a device or element able to apply pressure directly or indirectly on the extracting chamber 8. By way of non-limitative examples, the pressing system may include inflatable bags 71, 72, 73, pressing plates 74 or the like. In the cited Figs., the examples show inflatable bags 71, 72, 73 which may be inflated with fluid such as a gas fed by a reservoir, compressor or the like when the user wants to extract juice. Alternatively, the fluid may be a liquid. The rest of parts which belong to the pressing system has not been shown for the sake of clarity.

The deformable container 3 according to one example, may include a sheet 32, sheet or film defining the extracting chamber 8. Alternatively, the deformable container 3 may include several sheets. The sheet 32 may be arranged between the dividing ridge 5 and the extracting chamber 8. The sheet 32 may be made from an elastic, flexible or resilient material which may be the same as the one used for manufacturing the deformable container 3. The dividing ridge 5 may be made from a material relatively harder or more rigid than the sheet 32 or at least a portion of the deformable container 3.

It may be envisaged an exemplary deformable container 3 which may include an abutment region 34 where at least a portion of the dividing ridge 5 may be intended to abut. For instance, the abutment region 34 may be located in a region configured to contact the tip 51.

Figure 10:
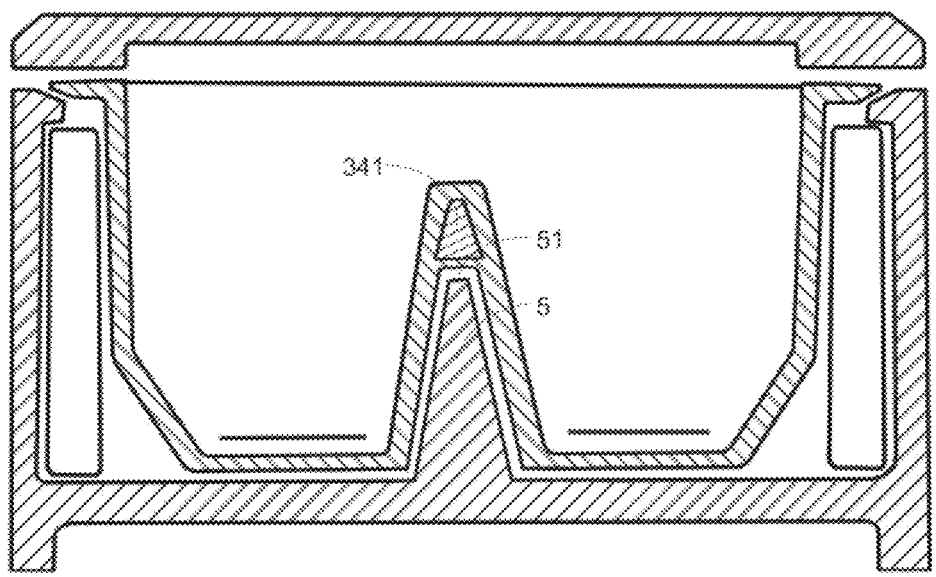

In some examples, the abutment region 34 may include a reinforcement 341. The reinforcement 341 may be chosen to withstand a strain caused by the tip 51. The reinforcement may be embodied as a sheet made from a material relatively harder or more rigid than the tip 51 or a generally triangular prism as illustrated in FIG. 10. The reinforcement may be placed embedded by the deformable container 3 or positioned at least partially on a face of the deformable container 3. When the reinforcement is placed on a face of the container, it may be configured to contact the tip 51 at least in use.

According to one example of the citrus juicer 1, the tip 51 may be configured as a blunt end of the dividing ridge 5 to abut on the deformable container 3. In alternative embodiments, the tip 51 might be sharp enough to tear the deformable container 3 so a shield might be placed in the abutment region or even on the sharp tip 51 to avoid the tearing.

The deformable container 3 may have a cavity 33 or recess to receive at least a portion of the dividing ridge 5. This example can be seen, for instance, in FIG. 1 where the cavity 33 is disposed in the bottom face 38 of the deformable container 3 and along the length thereof. The dimensions of the cavity 33 may be chosen such that the cavity 33 is large enough that at least a portion of the dividing ridge 5 may enter the cavity 33.

Although the illustrated examples of the Figs. show a cavity protruding from the bottom face 38, the cavity 33 may be disposed protruding from any faces of the deformable container 3 towards the extracting chamber 8. The position of the cavity 33 in the deformable container may vary depending on the location of the opening 31. In non-illustrated alternative examples, the cavity may be placed in a side face 39 of the deformable container 3.

The dividing ridge 5 may be configured to substantially match the shape of the cavity 33 in use. When the cavity 33 extends along the deformable container 3 the dividing ridge 5 may do the same. For instance, the dividing ridge 5 may have a generally wedge, truncated, trapezoidal or U-shaped cross section and so the cavity 33 as it may be readily seen in FIGS. 2-18. The cross section of the dividing ridge 5 may match the shape of the cavity 33 in use. The shape of the cross section, e.g. wedge shape, may allow to guide an opening of the citrus fruit C to form two halves which may be separated from each other. The shape of the cross section may also provide a guide to lead the extracted juice 12 from the citrus fruit C towards an outlet 36.

There is a plurality of exemplary dividing ridges 5 which may be implemented in the citrus juicer as herein disclosed. By way of example, the dividing ridge 5 may be integrally formed with the frame 2 (see FIGS. 2-7). As an alternative, at least one portion of the dividing ridge 5 may be integrally formed with the deformable container 3. As a further alternative, the whole dividing ridge 5 may be integrally formed with the deformable container 3, see for instance FIG. 9.

As illustrated in FIGS. 13-18, at least one portion of the dividing ridge 5 may be inflatable to exert pressure on the extracting chamber 8. The inflatable portion 73 may be an inflatable bag. The expansion of the inflatable portion of the dividing ridge 5 may be led at least substantially perpendicular to a line from the tip 51 to the base of the dividing ridge 5.

Alternatively, the deformable container 3 may include an inflatable region 72 to exert pressure on the extracting chamber 8. The inflatable region 72 may be an inflatable bag.

In a further non-illustrated example, the deformable container 3 may be formed from substantially flat surfaces or faces. The dividing ridge 3 may be able to move upwards and downwards with respect to the extracting chamber 8. The dividing ridge 3 may be linked to a driving mechanism to achieve the reciprocating movement. The deformable container 3 may have a region able to be deformed so as to define a cavity 33 for receiving the dividing ridge 5. In this case the elastic feature of the container's material allows to adapt the shape of the container 3 to form the cavity 33 to receive a portion of the dividing ridge 5.

Figure 11:
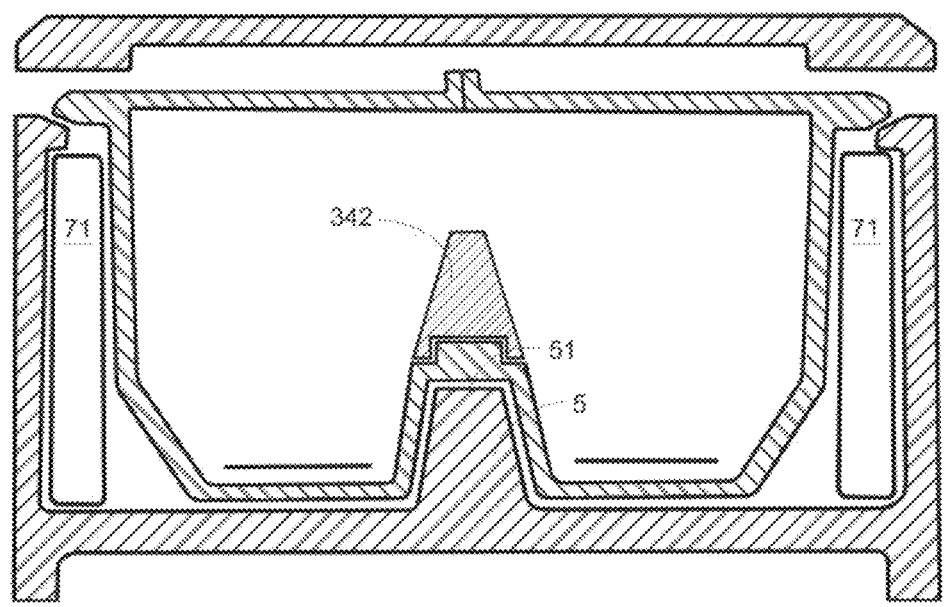

Referring now to the example of FIG. 11, the deformable container 3 may include a splitting element 342 arranged in the extracting chamber 8. The splitting element 342 may be made from a harder material than the deformable container 3. Furthermore, the splitting element 342 may have a triangular or trapezoidal shaped cross-section. The splitting element 342 may be detachably attached to the deformable container, for instance on the abutment region 34 as shown in FIG. 11. Therefore, the splitting element 342 may cooperate with the dividing ridge 5 when a dividing force 300 is applied to open the citrus fruit C. Thus, the splitting element 342 may help to open/divide the citrus fruit C.

Figure 12:
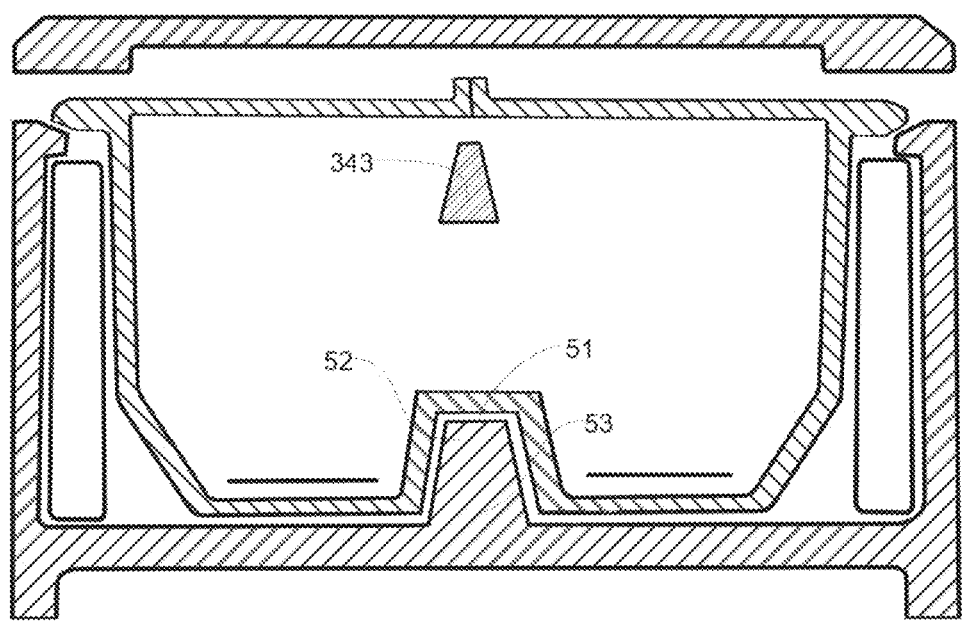
Figure 13:
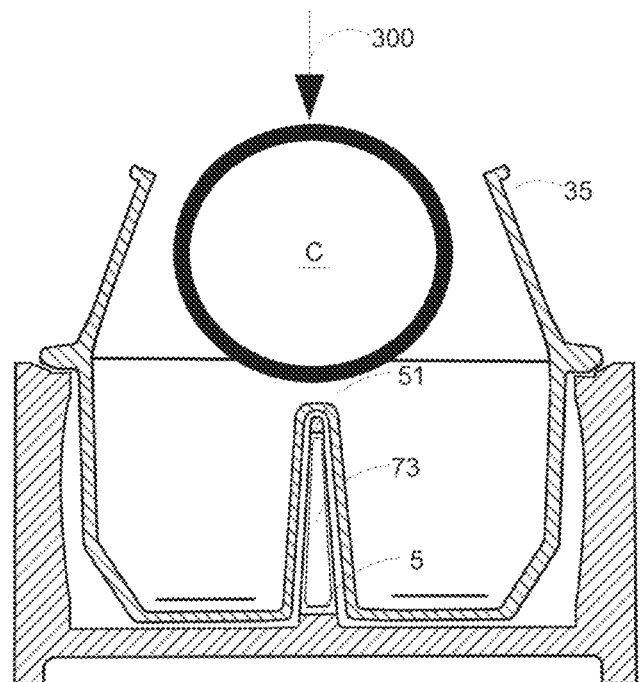
FIGS. 13-15 schematically show cross-section and partial views of a citrus juicer according to a further example in different stages of a juice extraction.
Figure 14:
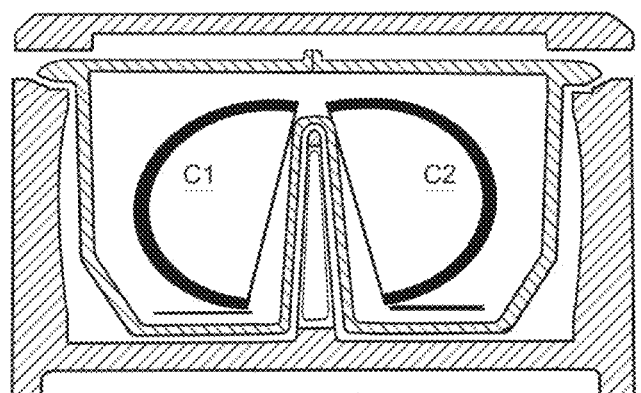
Figure 15:
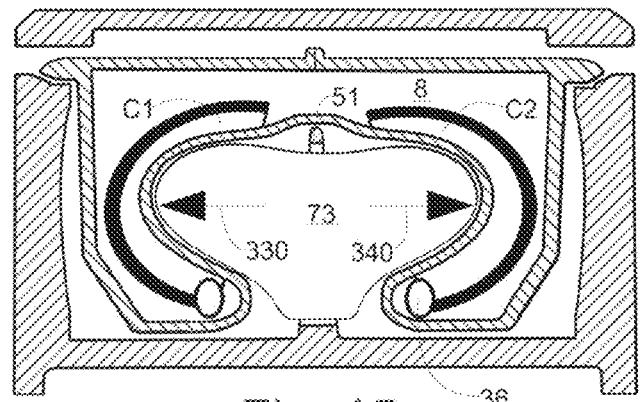
Figure 16:
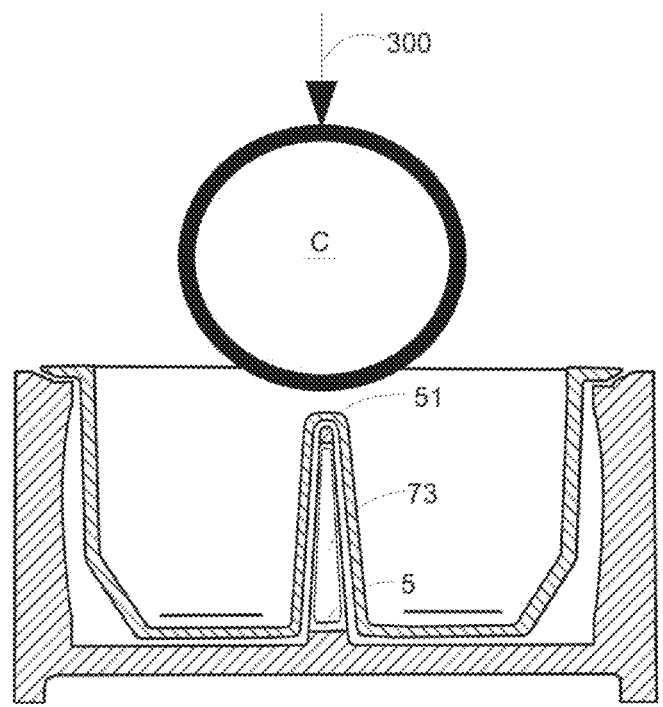
FIGS. 16-18 schematically show cross-section and partial views of a citrus juicer according to yet another example in different stages of a juice extraction.
Figure 17:
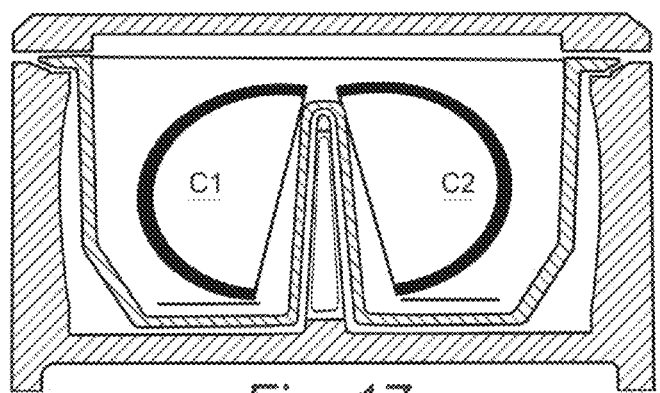
Figure 18:
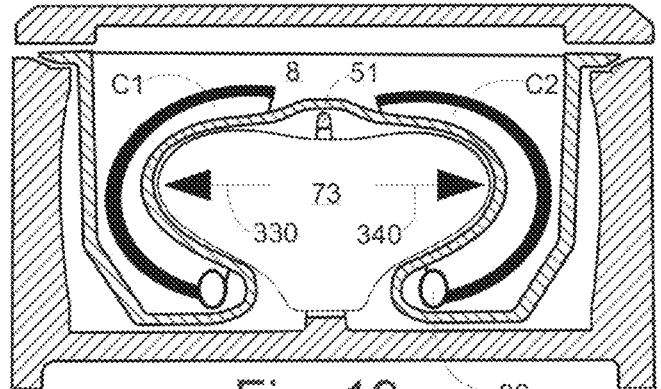

FIG. 12 shows an example wherein a cutting element 343 may be positioned in any suitable location in the deformable container 3. The cutting element 343 may be embodied as a shave, knife or the like along the length of the extracting chamber 8 or at least a portion. The cutting element 343 may allow to cut the skin of the citrus fruit C when fed into the extracting chamber 8. The cutting element 343 may be facing the opening 31 not to tear the deformable container 3.

As depicted in FIGS. 5-7, the deformable container 3 may be configured to enclose the citrus fruit C in a closed status of the socket 4. An example of this feature may be the container 3 provided with a container lid 35 to enclose the fruit C at least during extraction.

Figure 19:
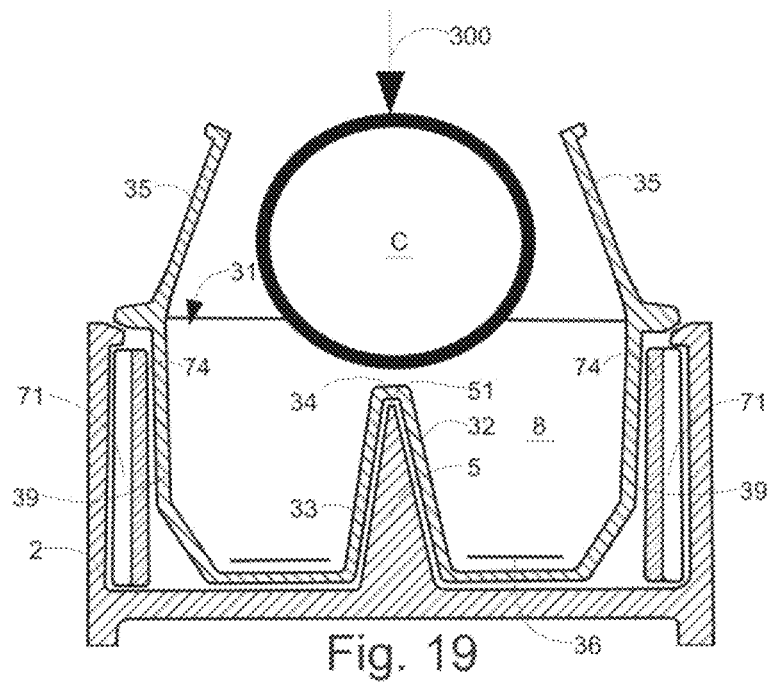
FIGS. 19-21 schematically show cross-section and partial views of a citrus juicer according to a yet further example in different stages of a juice extraction.
Figure 20:
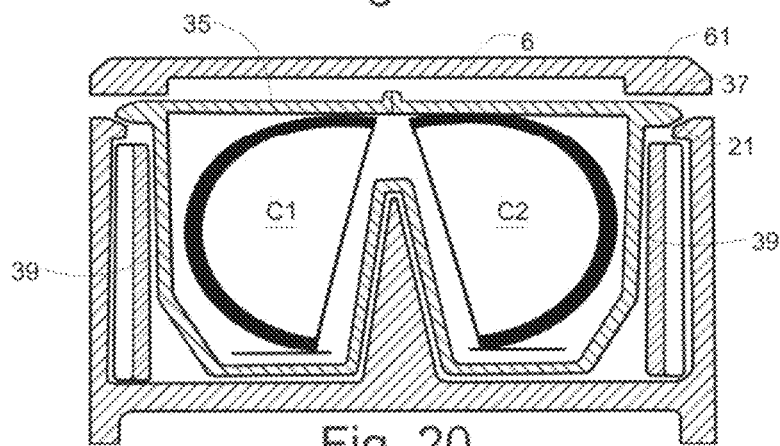

In the examples of the citrus juicer 1 which include pressing plates 74 such as those depicted in FIGS. 19-21, they may be movable with respect a surface of the socket 4 to contact the deformable container 3. The pressing plate 74 may be associated with an inflatable bag 71, such that the movement of pressing plate 74 may be caused by the inflatable bag 71. When the pressing system has pressing plates 74, a pair of pressing plates 74 may be movable towards and away from each other. This way a reciprocating movement of pressing plates 74 may be defined to apply pressure or not. The force exerted by the pressing system may be applied through the area of the pressing plates 74, so a pressure may be applied to the deformable container 3.

A control unit 200 may manage the volume reached by the bag 71, 72, 73 and/or a pressure built-up inside the extracting chamber 8 and/or the stroke of the pressing plate 74. The control unit 200 may also manage the pressure exerted on the extracting chamber 8. The control unit may obtain data from several suitable sensors 201. Therefore, it should be appreciated that a number of sensors 201 may be communicatively coupled to the control unit 200 using any suitable apparatus, system or method as for example a wired connection or a wireless connection. As such, the control unit 200 may be configured to receive one or more signals from the sensors 201 as input to produce corresponding output. For instance, depending on the data provided by the sensors 201, the control unit 200 may send the corresponding command to the pressing system to increase, decrease or keep the force and so the pressure exerted on the extracting chamber 8.

A user interface 202 may be also communicatively coupled to the control unit 200 using any suitable apparatus, system or method as above mentioned. The user interface 202 may be configured to receive instructions from the user, e.g. switches, buttons, dials, touch screen and so on. In further alternatives, the user may send their choice to the control unit 200 by any portable devices such as a smartphone, smartwatch, tablet or the like. The user's command may be received by the control unit 200 using any communication protocols.

In examples, the citrus juicer may include a holder 210 to hold at least one portion of citrus fruit C in the extracting chamber 8. An example of holder 210 can be seen in FIGS. 25-26 that schematically show cross-section and partial views of a citrus juicer with holder and bellows according to an example in different stages of a juice extraction.

In some examples, the holder 210 may be made, at least partially, from a shape-memory material, i.e. a material able to recover an initial shape after an expansion. In examples, the holder 210 may be made, at least partially, from flexible material.

Figure 25:
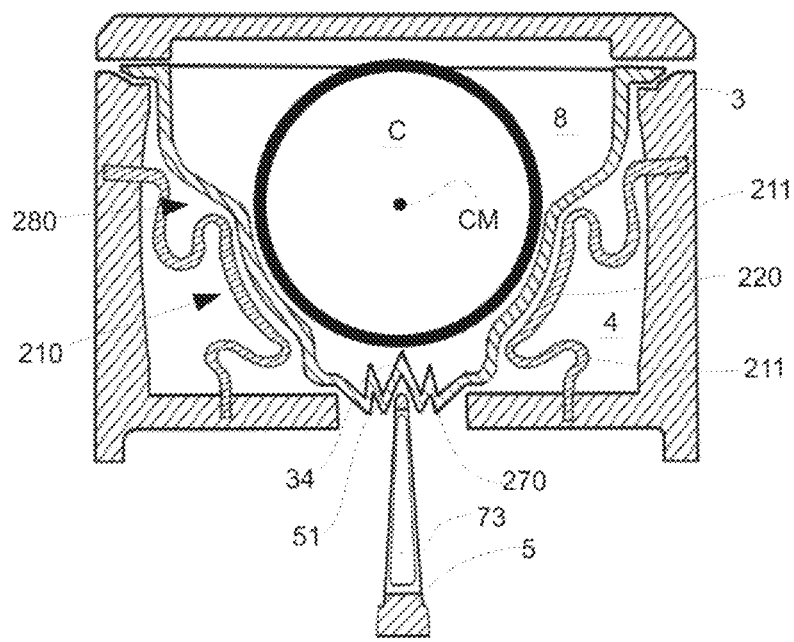
FIGS. 25-26 schematically show cross-section and partial views of a citrus juicer with holder and bellows according to an example in different stages of a juice extraction.
Figure 26:
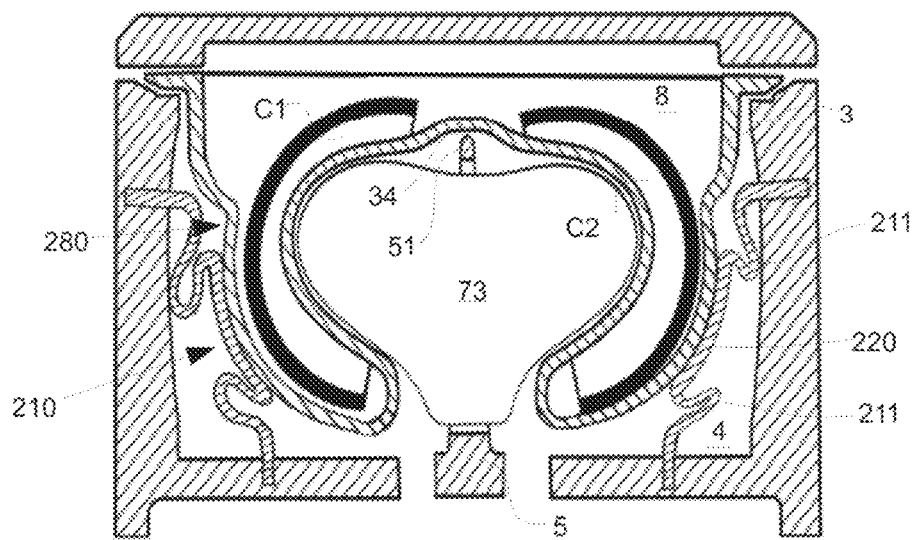

As shown in the example of FIGS. 25 and 26, the holder 210 includes a supporting region 220 resiliently attached to the frame 2. The exemplary holder 210 includes a laminar body installed within the socket 4, at least partially. The holder 210 has resilient portions 211 at both sides of the cross section of the supporting region 220 to adapt the position of the supporting region 220 to the size of the citrus fruit C.

In the illustrated example, the resilient portion 211 is an S-shaped portion of the laminar body. However, the resilient portion 211 may be of a different shape such that it may undergo a compression and expansion when receiving citrus fruit of different sizes and holding the fruit or portions of fruit during extraction of juice. In some examples, the resilient portion may be a kind of spring.

Following with the example of FIGS. 25 and 26. The supporting region 220 has a curve-shaped cross-section, at least partially. The curve-shaped cross section may allow to match, at least partially, a generally rounded shape of the outer surface of the fruit. In some examples, the supporting region 220 may have no curve-shaped cross-section.

The holder 210 may be attached to the frame 2 through their ends, as illustrated in FIGS. 25-26.

This exemplary holder 210 is arranged, at least partially, inside the socket 4 and outside the extracting chamber 8. This way, the holder 210 does not become dirty with the juice and waste from the extracting chamber 8.

Furthermore, the supporting region 220 in FIGS. 25-26 is positioned inside the socket 4 and outside the extracting chamber 8. Thus, the supporting region 220 is not brought into contact with the fruit and the corresponding waste and juice. The deformable container 3 may be arranged, between the supporting region 220 and the extracting chamber 8.

Following with the example of FIGS. 25-26, there are two holders 210 oppositely disposed with respect to the dividing ridge 5 to hold the fruit in-between. However, the number of holders 210 may vary, as examples shown in FIGS. 23-24 and 38-40. Furthermore, the location of the holders 210 may vary as well.

FIGS. 25-26 also show an example in which the abutment region 34 is joined to the rest of the deformable container 3 through a bellows 270. The dividing ridge 3 of FIGS. 25-26 may be linked to a driving mechanism (not illustrated) to achieve the herein mentioned reciprocating movement. In the example, a pair of bellows 270 are positioned at both sides of the abutment region 34. Details about the operation of the bellows 270 and the holder 210 in operation are provided later on.

The bellows 270 may be integrally made with the rest of the deformable container 3. Therefore, the bellows 270 may be integrally made with the abutment portion.

In some examples, the deformable container 3 may include a recess 280 to receive the holder 210 at least partially. For instance, a deformable container 3 can be seen in FIG. 23 that schematically shows a perspective view of a deformable container 3 according to an example. FIG. 24 schematically shows the deformable container of FIG. 23 with citrus fruit C. The recesses 280 may be intended to receive at least a part of the holder 210, e.g. the supporting region 220, 230, 240, 250. The recesses formed in the container 3 may allow to hold the citrus fruit C through the holder 210 while the presence of the container 3 may avoid the waste and juice to reach some parts of the juicer 1.

Figure 23:
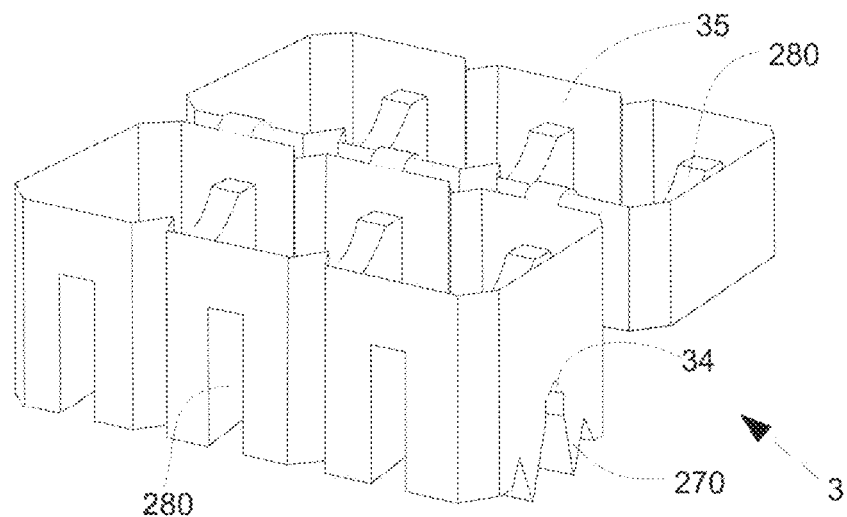
FIG. 23 schematically shows a perspective view of a deformable container according to an example.
Figure 24:
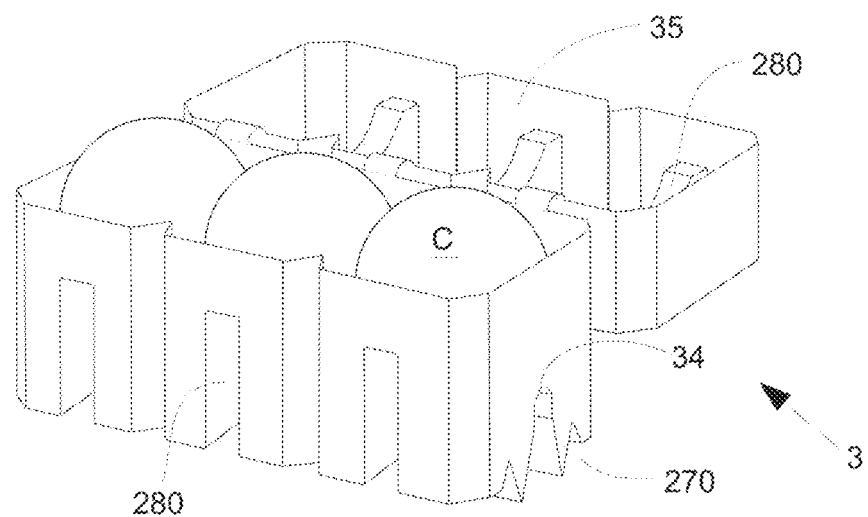
FIG. 24 schematically shows a perspective view of the deformable container of FIG. 23 with citrus fruit.

The deformable container 3 of FIGS. 23-24 present a container lid 35 unlike the examples of FIGS. 25-26. The container 3 may be formed with four recesses 280 for each fruit C, two in the container lid 35 or upper part and the other two in the lower part of the container 3, i.e. opposite to the container lid 35. In this example, the four holders 210 may be intended for each fruit.

Figure 38:
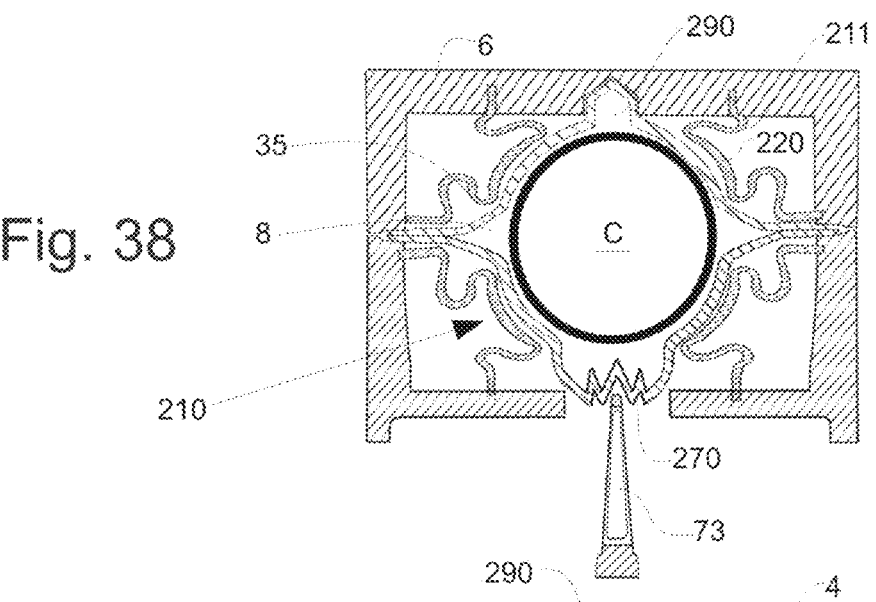
FIGS. 38-40 schematically show cross-section and partial views of a citrus juicer with holder and bellows according to some examples in different stages of a juice extraction.
Figure 39:
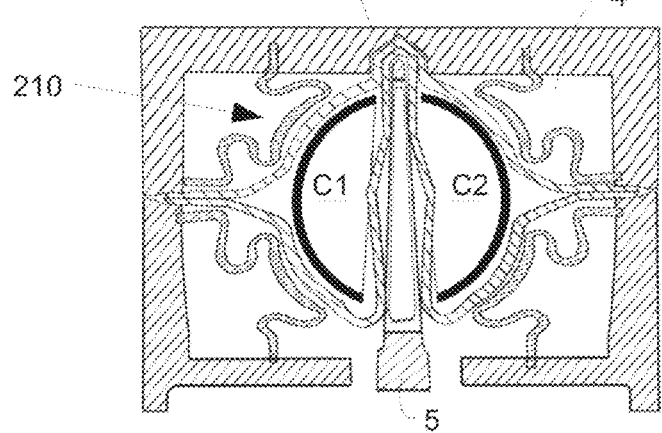
Figure 40:
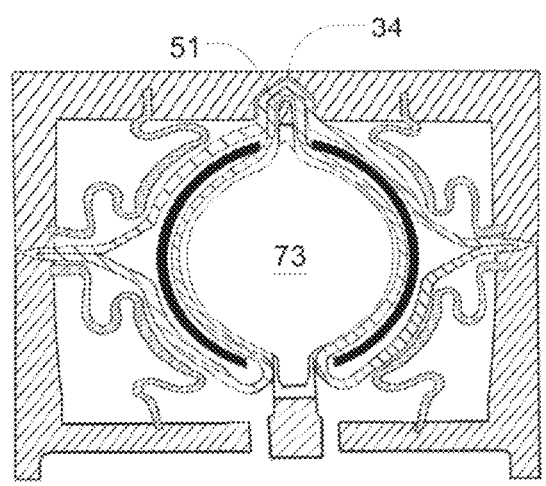

FIGS. 38-40 schematically show cross-section and partial views of a citrus juicer with holder and bellows according to some examples in different stages of a juice extraction. The exemplary citrus juicer of these Figs. includes four holders 210, two arranged associated with the container lid 35 and the other two in the lower part of the container 3. In examples not illustrated, all the holders 210 may be arranged associated with the lower part of the container 3 while none is associated with container lid 35

In examples, a single deformable container 3 according to FIGS. 23-24 may hold citrus fruit C of different sizes from each other. The holders 210 may act individually for each fruit C. In those Figs., the container 3 is conceived to hold up to three fruits C and has twelve recesses 280 to receive holders 210 to hold the three fruits C.

With reference to FIGS. 23-24, bellows 270 are illustrated. A bellows 270 may be arranged along, at least partially, the length of the container 3 or a number of bellows 270 may be arranged along the length, particularly in correspondence with each abutment region 34. In the example of a number of bellows along the length, a group of bellows may be disposed with their longitudinal axis aligned with each other.

Figure 27:
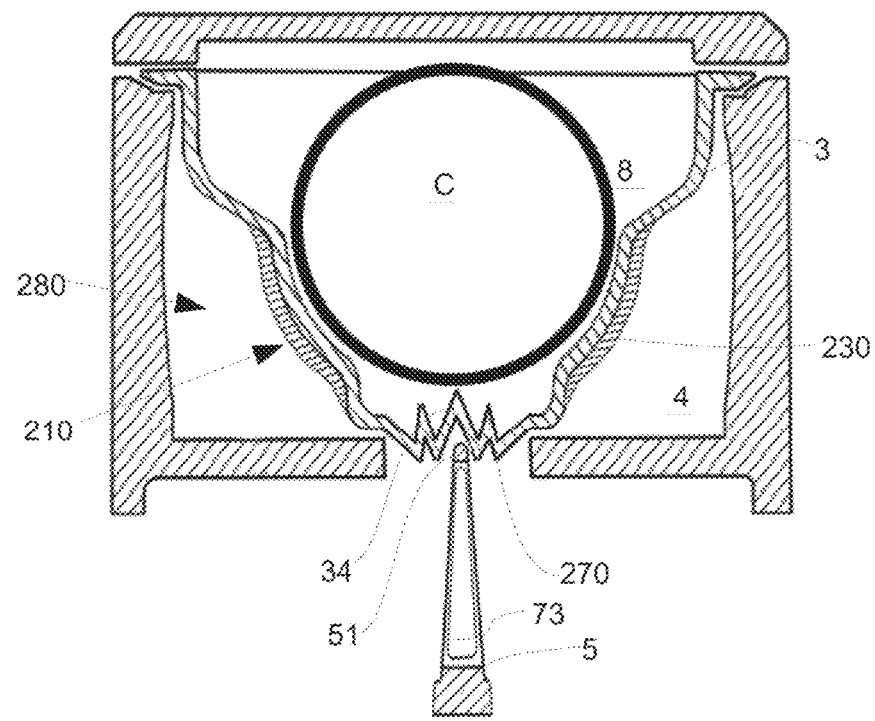
FIGS. 27-29 schematically show cross-section and partial views of a citrus juicer with holder and bellows according to some examples.
Figure 28:
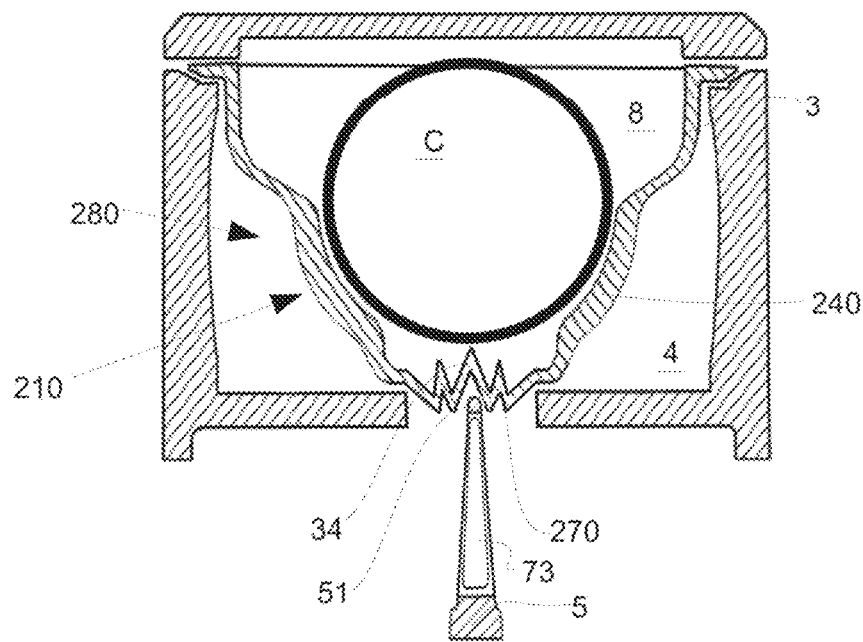
Figure 29:
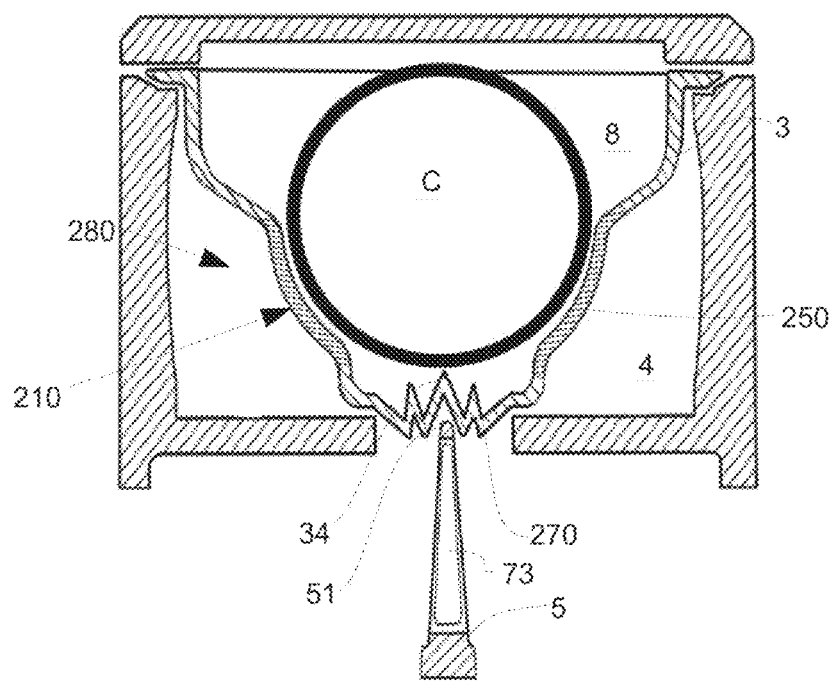

FIGS. 27-29 schematically show cross-section and partial views of a citrus juicer with holder 210 and bellows according to some examples.

In the example of FIG. 27, the holder 210 includes a supporting region 230 attached to the deformable container 3. In that Fig., the supporting region 230 is arranged outside the extracting chamber 8. However, the supporting region 230 may be arranged inside the extracting chamber 8, at least partially. The supporting region 230 may be made from a more rigid material than the deformable container 3, i.e. more rigid than the sheet that forms, at least partially, the container 3. The supporting region 230 may thus be deformed under a greater force than the deformable container.

The supporting region 230 may be attached to the deformable container by virtue of any suitable system or method such gluing, bonding, welding, snap-fitting, or the like.

In examples, the supporting region 230 may have a generally concave-shaped cross section to match at least partially the contour of a fruit C.

In the example of FIG. 28, the holder 210 includes a supporting region 240 and the supporting region 240 is a thickened portion of the deformable container 3. The supporting region 240 may be made from the same material as the deformable container since the supporting region 240 may be a portion of the deformable container. The thickened portion may present a substantially wider cross-section than the rest of the deformable container 3.

In the example of FIG. 29, the holder 210 includes a supporting region 250 and the supporting region 250 is a portion of the deformable container made of a material with different flexible properties than the rest of the container 3. The supporting region 250 may be integrally manufactured with the rest of the deformable container, e.g. by embedding the supporting region 250. The cross-section of the supporting region 250 may be substantially the same as the rest of the deformable container.

The supporting region 250 may be made from a material more rigid than the rest of the deformable container. The supporting region 250 may thus be deformed under a greater force than the rest of the deformable container.

Figure 33:
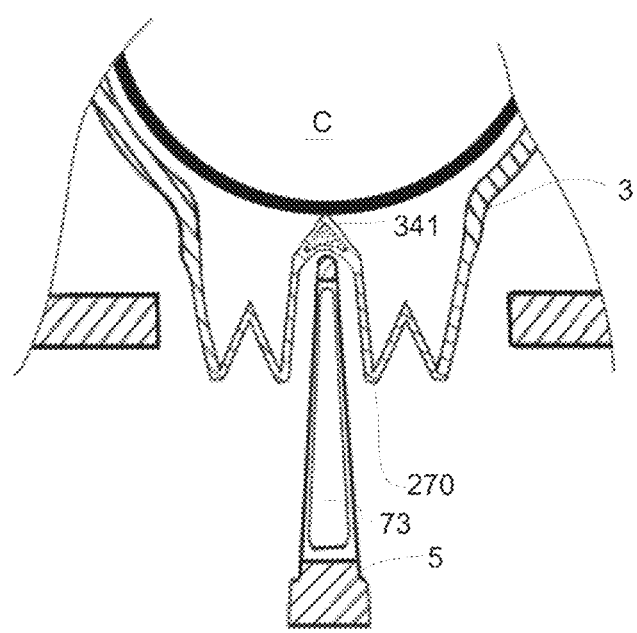
FIGS. 33-35 schematically show cross-section and partial views of dividing ridges and deformable containers with bellows according to some examples.
Figure 34:
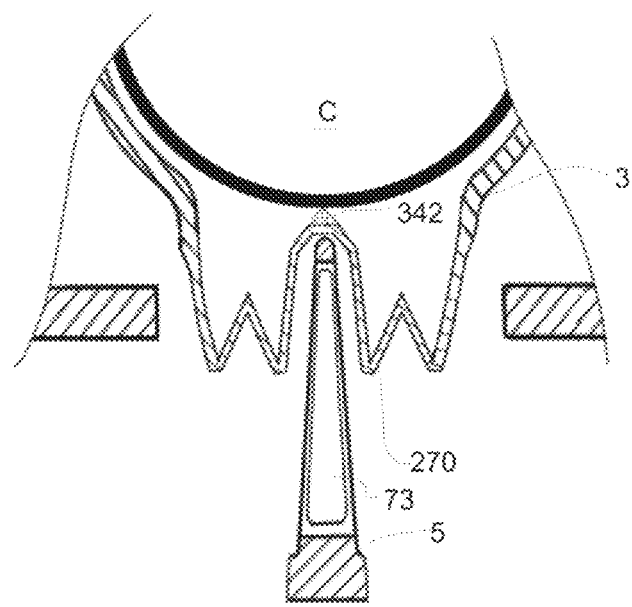
Figure 35:
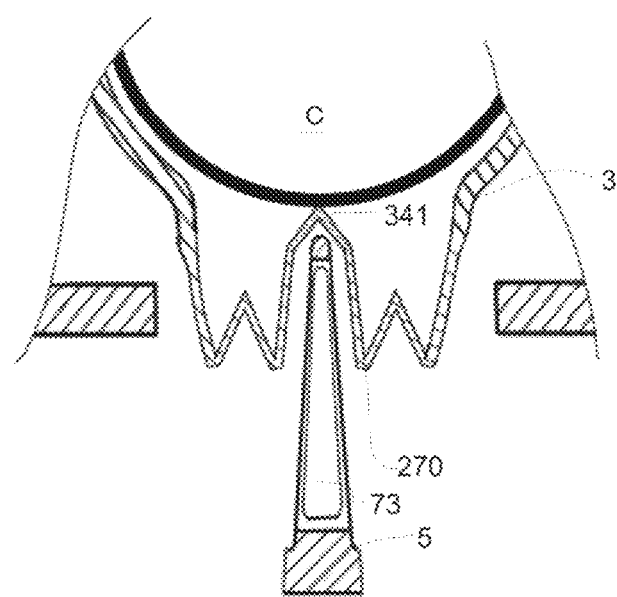

FIGS. 33-35 schematically show cross-section and partial views of dividing ridges 5 and deformable containers 3 with bellows 270 according to some examples.

In the example of FIG. 33, the deformable container 3 includes the bellows 270 at both sides of the abutment region 34 and the abutment region includes a reinforcement 341 as above described.

In the example of FIG. 34, a splitting element 342 as above described is detachably attached to the deformable container 3, for instance on the abutment region 34. There are a pair of bellows 270 at both sides of the abutment region 34.

In the example of FIG. 35, the reinforcement 341 is a portion of the deformable container 3 made from a material relatively harder or more rigid than the tip 51. In some examples, the reinforcement 341 may be a portion of the deformable container made from the same material as the rest of the deformable container with different properties such as shore. In examples, the reinforcement 341 may embedded in the container 3, e.g. during manufacture.

The bellows 270 in FIGS. 33-35 are illustrated in a contracted status. The dividing ridge 5 has not moved towards the deformable container 3 yet and folds of the bellows 270 can be seen. When the dividing ridge 5 emerges oriented to the extracting chamber 8, it pushes against the abutment region 34. Thus, the movement of the dividing ridge 5 may cause the bellows 270 to unfold forming a cavity to receive the dividing ridge 5 to a greater extent.

The number of folds of the bellows 270 may vary.

In some examples, the length of the cross-section of a bellows 270 may be substantially longer than an expected diameter of the citrus fruit C. Thus, at least the abutment region 34 may pass through all the diameter of the citrus fruit C so as to divide it.

Figure 36:
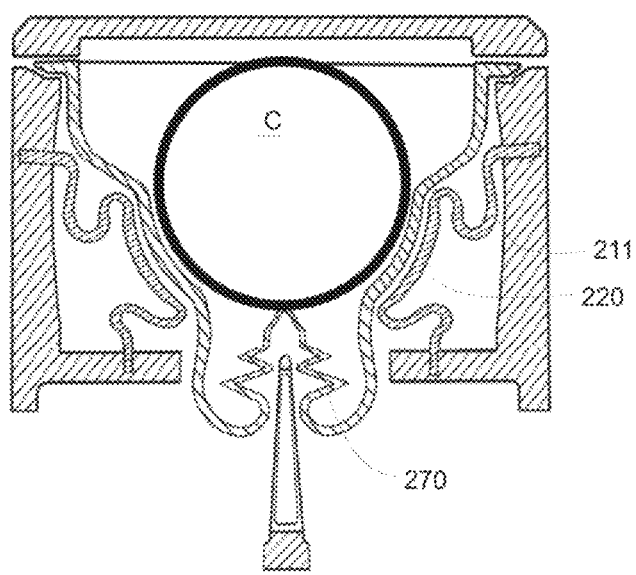
FIG. 36 schematically shows cross-section and partial views of a citrus juicer with holder and bellows according to some examples.

FIG. 36 schematically shows cross-section and partial views of a citrus juicer with holder and bellows according to some examples. The bellows 270 in the example of FIG. 36 are arranged substantially longitudinally with respect to the length of the cross section of the dividing ridge 5 when the dividing ridge 5 is retracted. In some other examples like those ones of FIGS. 34 to 36, the bellows are arranged substantially perpendicularly with respect to the length of the cross section of the dividing ridge 5 when the dividing ridge 5 is retracted.

Although the holder 210 and the bellows 270 have been illustrated together in FIGS. 25-32, 36 to 40, a citrus juicer 1 may have both features or one of them. In examples the citrus juicer 1 may be void of both features.

In examples of the citrus juicer, the deformable container 3 may include a nook 290 configured to receive at least a portion of the abutment region 34 and a portion of the dividing ridge 5. This example can be seen in FIGS. 38-40. In FIGS. 39 and 40, the dividing ridge 5 is, at least partially, in an extended position. The nook 290 may be arranged in a location opposite to the tip of the dividing ridge 5, seen in cross-section view. Although the example of FIGS. 38-40 is related to a movable dividing ridge 5 with respect to the extracting chamber, the nook 290 may be present when the dividing ridge is not movable with respect to the extracting chamber. Details about an example of operation of the citrus juicer with nook 290 are provided later on.

In some examples, the socket lid 6 may have a region with a complementary shape to the nook 290, as can be seen in FIGS. 38-40.

It could be possible to obtain a container for a citrus juicer including the features of the examples of FIGS. 25 to 32 and 36 to 40 and/or the features disclosed herein. These features would not be combined with the features of the rest of examples described herein.

It could be possible to obtain a container for a citrus juicer including the features of the examples of FIGS. 25 to 40 and/or the features disclosed herein. These features would not be combined with the features of the rest of examples described herein.

An example of operation of the citrus juicer 1 will be set forth in the following regarding a method for extracting juice.

According to a further aspect, a method 100 for extracting juice from citrus fruit is disclosed. The method 100 may be carried out with a citrus juicer according to any of herein disclosed examples. The method 100 may include:

feeding 101 citrus fruit C to the extracting chamber 8 of the deformable container 3 of the citrus juicer 1, the deformable container 3 being received in the socket. The citrus fruit C may enter the extracting chamber 8 through the opening 31. The fruit C may be placed inside the extracting chamber 8 in any condition as herein depicted. Thus, the citrus fruit C may contact, at least, the deformable container.

The citrus fruit C may be introduced into the extracting chamber 8 in a direction substantially towards the dividing ridge 5, e.g. towards the tip 51. FIGS. 2, 5, 13, 16 and 19 illustrate examples wherein the citrus fruit C is about to contact the deformable container 3, particularly on the abutment region 34;

causing 102 the fruit C to be divided by the dividing ridge 5 when the citrus fruit C is pressed against the tip 51 thereof. When the citrus fruit C has been fed to the extracting chamber 8, a dividing force 300 may be applied on the citrus fruit C by a relative movement defined between the dividing ridge 5 and/or the panel. So, the dividing force 300 may be exerted by the dividing ridge 5 or the panel. In the examples of FIGS. 2, 5, 13, 16 and 19, the force 300 is exerted by the panel downwardly, in a direction contained in a substantially median plane of the cross section of the dividing ridge 5. The direction of force 300 in the cited examples is substantially perpendicular to the bottom face 38 of the deformable container 3. Force 300 may be applied by the socket lid 6 when closing the opening 31 and/or the container lid 35 and/or the user pressing the fruit C against the region where the dividing ridge 35 is placed. The socket lid 6 may be manually actuated or automatically assisted. As a result of the dividing force 300 applied on the citrus fruit C and the reaction caused by the dividing ridge 5, the fruit C becomes divided at least partially, into two halves C1, C2. The latter can be seen in FIG. 3, 6, 14, 17 or 20.

A strain may be caused in the region of the peel of the fruit C which is indirectly pressed by the dividing ridge 5. This strain may tear the peel. Afterwards, the citrus fruit may be divided by the ridge 5 and the container 3 adapted to the shape of the ridge 5.

When the deformable container 3 includes container lid 35, the closure movements of socket lid 6 and container lid 35 may be performed in a coordinated way. The dividing ridge 5 may be configured not to tear the deformable container 3, and so the dividing ridge 5 does not enter the extracting chamber 8 where the citrus fruit has been placed. The dividing ridge 5 may be kept in place when the force 300 is exerted.

In some non-illustrated examples, the dividing force may be exerted by the dividing ridge 5 moving towards the citrus fruit C and the panel, e.g. the socket lid 6 or a socket wall. The dividing force may be applied opposite to the illustrated direction 300, for instance upwardly. Thus, the force 300 may be applied towards the fruit C and against the socket lid 6 or a socket wall or container lid 35. The way to open the fruit C may be similar to the above but the direction of the forces may be substantially the opposite.

The dividing force 300 may be in the range of about 10 N to about 300 N:

pressing 103 the extracting chamber 8 with the opened citrus fruit C1, C2 against the socket 4 to produce juice. Some examples of this feature are illustrated in FIG. 4, 7, 15, 18 or 21. When the extracting chamber 8 is pressed, the divided citrus fruit C1, C2 placed inside may also be pressed and so the extraction of the juice from the citrus fruit C1, C2 may be performed. The extracting chamber 8 may be directly or indirectly pressed elements 71, 72, 73, 74 of pressing system. Those elements 71, 72, 73, 74 may be moved or expanded (action) against the extracting chamber 8 which cannot be expanded because of the presence of the closed socket 4 (reaction). The room inside the closed socket 4 may be limited, so an expansion or movement of the elements 71, 72, 73, 74 of pressing system may cause compression of deformable container 3. Therefore, the container 3 may be at least partially deformed from the original configuration, for instance when the fruit C is introduced into the extracting chamber 8, and the volume of the extracting chamber 8 may be substantially reduced. Side faces 39 or bottom face 38 or container lid 35 may undergo deformations. The deformable container 3 may be deformed from a undeformed position where the pressing system does not apply substantially any force (and so pressure) to the container, to a deformed position where the pressing system applies, at least partially, a force (and so pressure) to the container. In the example wherein there is deformable tab in the outlet 36, the deformable tab may be deformed correspondingly.

The volume may be reduced from the state in which the fruit C is introduced into the extracting chamber 8. As the volume of extracting chamber 8 is substantially reduced, pressure inside the extracting chamber 8 may rise and juice may leave the citrus fruit C1, C2.

Extracting forces 310, 320, 330, 340 may be exerted against the extracting chamber 8 with divided fruit C. The extracting forces may be exerted over an area between elements 71, 72, 73, 74 of pressing system and extracting chamber 8, so a pressure may be applied to the extracting chamber 8 and a pressure may be built-up inside the extracting chamber 8. Extracting forces 310, 320, 330, 340 may be applied in a direction substantially horizontal i.e. laterally with respect to the side faces 39. Dividing force 300 may be different from pressing forces 310, 320, 330, 340. In some examples, dividing force 300 may be substantially perpendicular to extracting forces 310, 320, 330, 340. Furthermore, force 300 may be applied in a substantially different moment than forces 310, 320, 330, 340.

According to one example, extracting forces 310, 320 may be exerted by inflatable bags 71 positioned for instance in the side walls of socket 4 when the inflatable bags 71 are inflated and so expanded. This case can be seen, for instance, in FIGS. 2 to 12. In this example, extracting forces may be applied to push halves of citrus fruit C1, C2 against at least the dividing ridge 5.

According to another example, extracting forces 310, 320 may be exerted by inflatable bags 72 positioned or formed in the side faces of deformable container 3 (see FIG. 8) when the inflatable bags 72 are inflated and so expanded.

According to a further example, extracting forces 330, 340 may be exerted by inflatable bag 73 positioned or formed for instance in the dividing ridge 5 when the inflatable bag 73 are inflated and so expanded. In this example, extracting forces 330, 340 may push halves of citrus fruit C against at least side walls of the socket 4.

According to a yet further example, extracting forces are exerted by pressing plates 74 positioned for instance in the side walls of socket 4 (see FIGS. 19-21) when the inflatable bags 71 are inflated and so expanded. When the inflatable bags 71 are expanded, the pressing plates 71 may be pushed against the side faces 39 of deformable container 3.

According to one example, a pressure inside the extracting chamber 8 may be built up when the pressing system is operated. The pressure inside the extracting chamber 8 may be in the range of 0.5 bar to 20 bar (50 kPa to 2,000 kPa).

The method 100 may further include dispensing the juice 12 through the outlet 36 of the container. The closed opening 31 of the deformable container 3 and the use of a water-proof material may cause that the juice 12 extracted from the citrus fruit C1, C2 may leave the extracting chamber 12 passing through the outlet 36. As above described, the deformable tab of the outlet 36 may be configured to allow the flow of juice 12 when the tab is deformed.

When the deformable container 3 is not provided with an outlet 36 as such, the user may remove the tray-like deformable container 3 from the socket 4 and pouring the juice accordingly using the opening 31 as an outlet. When the container includes an outlet 36 as such, the container can allow extraction of juice, without further handling by the user.

In an example of the method 100, pressing the extracting chamber 8 with the opened citrus fruit C may include exerting forces 310, 320, 330, 340 on the extracting chamber in at least two pressing steps, and reducing, at least partially, the pressure exerted on the extracting chamber 8 between the two pressing steps. This way, the amount of juice 12 extracted from fruit C may be enhanced.

In some examples of the method 100, the extracting forces 310, 320, 330, 340 exerted in a last pressing step may be greater than the force exerted in a previous pressing step.

In some examples of the method 100, a last pressing step may be shorter than the previous pressing step.

In some examples, for instance examples of FIGS. 25-26, the method 100 may include holding citrus fruit C in the extracting chamber in a predefined position thereby the tip 51 of the dividing ridge, seen in a cross-section view, may be oriented towards the geometric center of the citrus fruit C. In some non-illustrated examples, the tip 51 may be oriented away from the geometric center. In FIG. 25 the citrus fruit C has been fed in the extracting chamber 8. Although the FIGS. 25 and 26 show clearances between elements for the sake of clarity, the fruit C may press on the supporting region 220 through the deformable container 3 and substantially no clearance may exist indeed. Depending on the size of the fruit the supporting region 220 may receive more pressure and the resilient portions 211 may be deformed accordingly to absorb displacement of supporting region 220. Thanks to the holder 210 the fruit C may be optimally placed inside the extracting chamber 8. In FIG. 25, the bellows 270 are retracted because the dividing ridge 5 is also retracted. The bellows 270 show an accordion-like shape when retracted.

In FIG. 26, the dividing ridge 5 has been moved towards the citrus fruit C, e.g. towards the center of mass CM. As the fruit is divided, a pressure exerted on the supporting region 220 of the holder 210 may be increased and the resilient portions 211 may be further deformed. The tip 51 may push the abutment region 34 and a cavity may be formed to receive the dividing ridge 5. The cavity may be formed due to the amount of material "stored" by virtue of the folds of the bellows 270 that may be gradually expanded when the dividing ridge 5 moves towards the extracting chamber 8.

When the dividing ridge 5 becomes wider due to the expanded inflatable bag 73, the resilient portions 211 may be even more deformed to absorb the pressure exerted by the inflatable dividing ridge 5. As the inflatable bag 73 becomes more expanded, the folds of bellows 270 may not be appreciated.

Once the juice extraction of the fruit C has been substantially completed in FIG. 26, the inflatable bag 73 of the dividing ridge 5 may be retracted, i.e. returned to the state of FIG. 25 and then the dividing ridge 5 may be retracted as shown in FIG. 25.

When the pressure to extract the juice has been removed, the supporting region 220 may return to its initial position thanks to the elastic and flexible properties of the resilient portion 211. The halves C1, C2 may be approached in a controlled way thanks to the holder 210.

The displacement of the supporting regions 220 moving away and towards may be done in a predictable and repetitive way.

Figure 30:
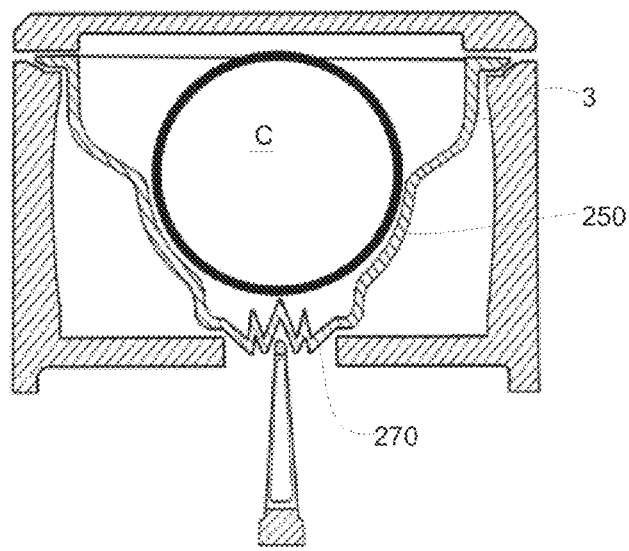
FIGS. 30-32 schematically show cross-section and partial views of a citrus juicer with bellows according to some examples in different stages of a juice extraction.
Figure 31:
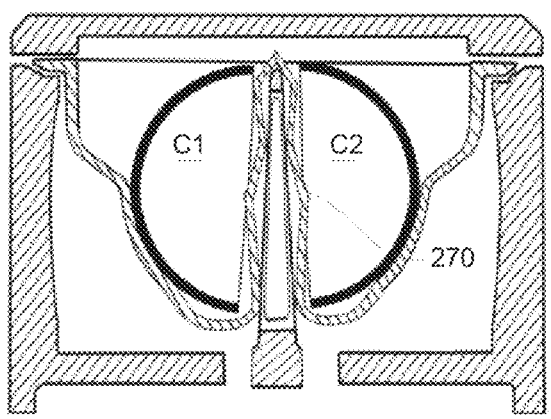
Figure 32:
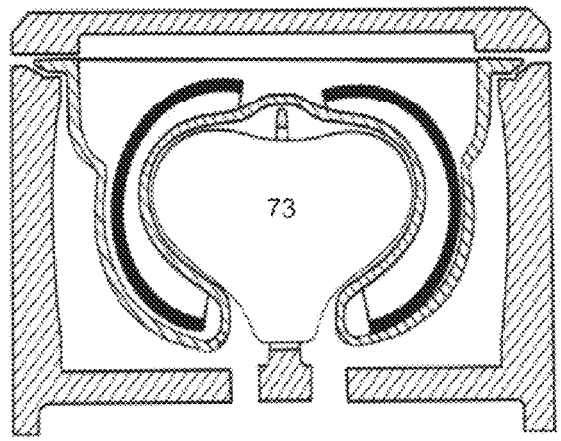

FIGS. 30-32 schematically show cross-section and partial views of a citrus juicer with bellows according to some examples in different stages of a juice extraction. General details about the juice extraction are similar to those already disclosed herein so the following description provides particular details about FIGS. 30-32. The citrus juicer 1 has a supporting region 250 of holder 210 according to the example illustrated in FIG. 29, i.e. the supporting region 250 is made from a material with different flexible properties than the rest of the deformable container 3. FIG. 30 show an exemplary stage in which the dividing ridge 5 and the bellows 270 are retracted, and the supporting region 250 keeps the fruit C in an optimal predefined position as herein disclosed. The folds of bellows 270 can be clearly seen. In FIG. 31, the dividing ridge 5 has moved towards the extracting chamber 8 without entering due to the deformable container 3. The folds of bellows 270 in FIG. 31 can be seen as well although they have been smoothed with respect to the FIG. 30. The fruit C has been divided as herein disclosed. The supporting region 250 keeps the halves C1, C2 in a position with respect the dividing ridge. In FIG. 32, the inflatable bag of the dividing ridge 5 has been inflated and the halves C1, C2 are pressed to extract the juice. The folds of the bellows 270 are not visible and supporting regions 250 are substantially deformed due to the deployment of the inflatable bag 73.

Once the juice extraction of the fruit C has been substantially completed in FIG. 32, the inflatable bag 73 of the dividing ridge 5 may be retracted, i.e. returned to the state of FIG. 31 and then the dividing ridge 5 may be retracted as shown in FIG. 30.

When the pressure to extract the juice has been removed, the supporting region 250 may return to its initial position thanks to its elastic and flexible properties. The halves C1, C2 may be approached in a controlled way thanks to the holder 210.

The expansion and contraction of the supporting region 250 may be done in a predictable and repetitive way.

The dividing ridge 5 of FIGS. 25-33 correspond to the example of dividing ridge 5 that may be inflatable. However, the dividing ridge 5 may be any of the herein disclosed examples.

Figure 37:
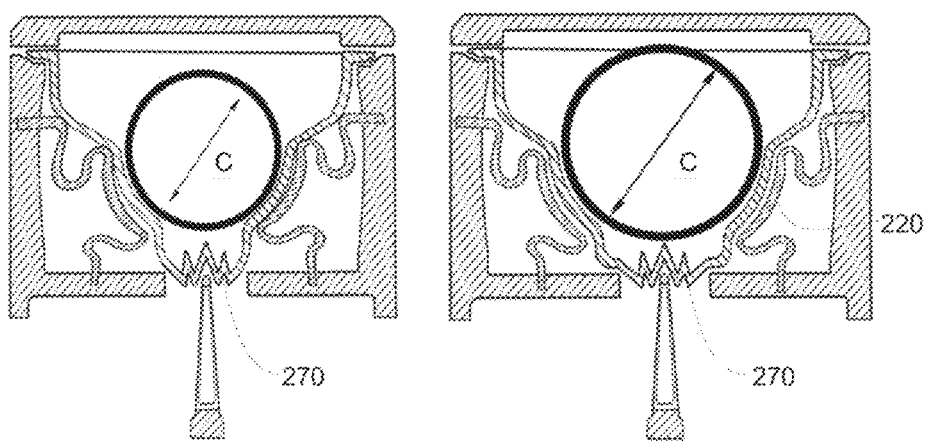
FIG. 37 schematically shows cross-section and partial views of a citrus juicer with holder and bellows with citrus fruits of different sizes according to examples.

FIG. 37 schematically shows cross-section and partial views of a citrus juicer with holder and bellows with citrus fruits of different sizes according to examples. The holder 210 of both examples of FIG. 37 correspond to the holder 210 of FIGS. 25 and 26. On the right, the extracting chamber 8 receives a citrus fruit C with a larger diameter/size than the one in the Fig. on the left. The supporting regions 220 may support the citrus fruit C with the deformable container 3 in-between. The resilient portions 211 of the example on the right are more deformed than the resilient portions 211 on the left because they have to absorb a greater displacement of the supporting regions 220 holding the largest fruit C. In both cases, the citrus fruit may be kept in a predefined position regardless of their size.

FIGS. 38-40 schematically show cross-section and partial views of a citrus juicer with holder and bellows according to some examples in different stages of a juice extraction. The citrus fruit C is received in the extracting chamber 8 in FIG. 38. The holders 210 may keep/maintain the citrus fruit C in a predefined position as herein disclosed. The fruit C does not enter the nook 290. In FIG. 39 the dividing ridge 5 has been moved into the socket 4. The dividing ridge 5, and particularly the tip 51 may reach the nook 290. The tip 51 is surrounded when seen in cross-section view by the deformable container 3, e.g. the sheet forming the deformable container. The nook 290 may be formed by the same sheet as the abutment region 34. Therefore, the tip 51 may be surrounded by two layers of the same sheet when reaches the nook 290. When the tip 51 reaches the nook 290, the citrus fruit C may be fully divided into two halves C1, C2. A full division may be accomplished. In the example of FIG. 39, a substantially full stroke of the dividing ridge 5 can be seen. In FIG. 40, the inflatable bag 73 is expanded so as to extract the juice. Holders 210 may keep the citrus fruit C or C1, C2 in a proper position inside the extracting chamber.

The nook 290 may be present in a fruit juicer 1 with a non-movable dividing ridge 5 with respect to the extracting chamber. The extracting operation when the dividing ridge 5 is not movable has been described herein so no further details are provided. The nook 290 may also receive the tip 51 when the socket 4 is closed, for instance by the lid 6.

Although the feature of the nook 290 has been illustrated in examples of FIGS. 38-40 along with bellows 270 and holders 210, the presence of nook 290 is not inextricably linked to bellows 270 and/or holders 210.

A substantially full stroke of the dividing ridge is also illustrated in FIGS. 26, 31, 32.

It could be possible to obtain a method for extracting juice from citrus fruit the features disclosed herein and/or using a container for a citrus juicer that includes the features of the examples of FIGS. 25 to 32 and 36 and/or the features disclosed herein. The features would not be combined with the features of the rest of examples described herein.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

For reasons of completeness, various aspects of the inventions hereof are set out in the following numbered clauses:

Clause 1. A citrus juicer including:
a deformable container forming an extracting chamber intended to receive at least one portion of citrus fruit, and having an opening for introducing the citrus fruit;

a frame forming a socket to receive the deformable container;
a dividing ridge having a cross-section with a tip oriented towards the extracting chamber, and the dividing ridge is arranged to divide the citrus fruit when the citrus fruit is pressed against the tip thereof;
a pressing system to exert pressure on the extracting chamber and against the socket.

Clause 2. The citrus juicer according to clause 1, the deformable container including a sheet arranged between the dividing ridge and the extracting chamber.

Clause 3. The citrus juicer according to any of clauses 1-2, the deformable container having a cavity to receive at least a portion of the dividing ridge.

Clause 4. The citrus juicer according to any of clauses 1-3, at least one portion of the dividing ridge being integrally formed with the deformable container.

Clause 5. The citrus juicer according to any of clauses 1-4, further including a panel to constrain the citrus fruit in the extracting chamber, at least one of the dividing ridge and the panel being movable towards the other to cause the citrus fruit to be pressed against the tip of the dividing ridge.

Clause 6. The citrus juicer according to any of clauses 1-5, at least one portion of the dividing ridge being inflatable to exert pressure on the extracting chamber.

Clause 7. The citrus juicer according to any of clauses 1-6, the deformable container including an inflatable region to exert pressure on the extracting chamber.

Clause 8. The citrus juicer according to any of clauses 1-7, the deformable container including an abutment region where at least a portion of the dividing ridge is intended to abut.

Clause 9. The citrus juicer according to clause 8, the abutment region including a reinforcement.

Clause 10. The citrus juicer according to any of clauses 1-9, the deformable container including a cutting element arranged in the extracting chamber.

Clause 11. The citrus juicer according to any of clauses 1-10, the deformable container including an outlet to dispense juice from pressed fruit.

Clause 12. The citrus juicer according to any of clauses 1-11, the tip of the dividing ridge including a blunt end to abut on the deformable container.

Clause 13. The citrus juicer according to any of clauses 1-12, the deformable container being configured to enclose the fruit in a closed status of the socket.

Clause 14. A method for extracting juice from citrus fruit, including:
feeding citrus fruit to an extracting chamber of a deformable container of a citrus juicer, the container being received in a socket;
causing the fruit to be divided by a dividing ridge when the citrus fruit is pressed against a tip of the dividing ridge;
pressing the extracting chamber with the divided citrus fruit against the socket to produce juice.

Clause 15. The method according to clause 14, the pressing the extracting chamber with the opened citrus fruit including:
exerting pressure on the extracting chamber in at least two pressing steps;
reducing, at least partially, the pressure exerted on the extracting chamber between the two pressing steps.

The invention claimed is:

1. A citrus juicer comprising:
a deformable container forming an extracting chamber intended to receive at least one portion of citrus fruit, and having an opening for introducing the at least one portion of citrus fruit, the extracting chamber having an interior space defined by the deformable container;
a frame forming a socket to receive the deformable container;
a dividing ridge having a cross-section with a tip oriented towards the extracting chamber, and the dividing ridge being arranged to divide the at least one portion of citrus fruit when the at least one portion of citrus fruit is pressed against the tip thereof;
a pressing system to exert pressure on the extracting chamber and against the socket;
the deformable container comprising a sheet arranged between the dividing ridge and the extracting chamber, the sheet forming a part of the deformable container, the sheet thereby defining at least a portion of the interior of the deformable container and thereby also defining at least a portion of the interior of the extracting chamber, the extracting chamber defined by the deformable container and by the sheet being a single extracting chamber having a single interior size defined coextensively by the deformable container and by the sheet.

2. The citrus juicer according to claim 1, the deformable container having a cavity to receive at least a portion of the dividing ridge.

3. The citrus juicer according to claim 1, further comprising a panel to constrain the citrus fruit in the extracting chamber, at least one of the dividing ridge and the panel being movable towards the other to cause the citrus fruit to be pressed against the tip of the dividing ridge.

4. The citrus juicer according to claim 1, at least one portion of the dividing ridge being inflatable to exert pressure on the extracting chamber.

5. The citrus juicer according to claim 1, at least one portion of the dividing ridge being integrally formed with the deformable container.

6. The citrus juicer according to claim 1, the deformable container comprising an abutment region where at least a portion of the dividing ridge is disposed to abut.

7. The citrus juicer according to claim 6, the abutment region comprising a reinforcement.

8. The citrus juicer according to claim 1, the deformable container comprising a cutting element arranged in the extracting chamber.

9. The citrus juicer according to claim 1, the tip of the dividing ridge comprising a blunt end to abut on the deformable container.

10. The citrus juicer according to claim 6, the abutment region being joined to the rest of the deformable container through a bellows.

11. The citrus juicer according to claim 1, comprising a holder to hold at least one portion of citrus fruit in the extracting chamber.

12. The citrus juicer according to claim 11, the holder comprising a supporting region resiliently attached to the frame.

13. The citrus juicer according to claim 11, the holder comprising a supporting region attached to the deformable container.

14. The citrus juicer according to claim 11, the holder comprising a supporting region and the supporting region is a thickened portion of the deformable container.

15. The citrus juicer according to claim 11, the holder comprising a supporting region and the supporting region is a portion of the deformable container made of a material with different flexible properties than the rest of the container.

16. The citrus juicer according to claim 11, the deformable container comprising a recess to receive the holder at least partially.

17. The citrus juicer according to claim 6, the deformable container comprising a nook configured to receive at least a portion of the abutment region and a portion of the dividing ridge.

18. A method for extracting juice from citrus fruit, comprising:
- feeding citrus fruit into an interior space of an extracting chamber of a deformable container of a citrus juicer, the deformable container being received in a socket and the deformable container is made of flexible material; the deformable container comprising a sheet arranged between the dividing ridge and the extracting chamber, the sheet and the deformable container defining the interior space of the extracting chamber, the extracting chamber defined by the deformable container and by the sheet being a single extracting chamber having a single interior size defined coextensively by the deformable container and by the sheet;
- causing the fruit to be divided by a dividing ridge when the citrus fruit is pressed against a tip of the dividing ridge;
- pressing the extracting chamber with the divided citrus fruit against the socket to produce juice.

19. A citrus juicer comprising:
- a deformable container forming an extracting chamber to receive at least one portion of citrus fruit, and having an opening for introducing the citrus fruit, the deformable container being made of flexible material;
- a frame forming a socket to receive the deformable container;
- a dividing ridge having a cross-section with a tip oriented towards the extracting chamber, and the dividing ridge is to divide the citrus fruit when the citrus fruit is pressed against the tip thereof;
- the deformable container comprising a sheet arranged between the dividing ridge and the extracting chamber, the sheet forming a part of the deformable container, the sheet thereby defining at least a portion of the interior of the deformable container and thereby also defining at least a portion of the interior of the extracting chamber, the extracting chamber defined by the deformable container and by the sheet being a single extracting chamber having a single interior size defined coextensively by the deformable container and by the sheet, the dividing ridge disposed relative to the extracting chamber such that the dividing ridge is to guide a splitting of the fruit without contacting the fruit;
- a pressing system to exert pressure on the extracting chamber and against the socket.

\* \* \* \* \*